(12) United States Patent
Elumalai et al.

(10) Patent No.: US 12,322,155 B2
(45) Date of Patent: Jun. 3, 2025

(54) SYSTEMS AND METHODS FOR ON-DEVICE OBJECT RECOGNITION VIA MOBILE DEVICE CLUSTER

(71) Applicant: Walmart Apollo, LLC, Bentonville, AR (US)

(72) Inventors: Monisha Elumalai, Dallas, TX (US); Jody P. Cook, Raleigh, NC (US); Michael A. Garner, Centerton, AR (US); Francisco J. Rodriguez, Framingham, MA (US); Luis R. Rosario-Berrios, Arlington, TX (US); Christopher M. Overcash, Bentonville, AR (US); Ravi Kumar Dalal, Dallas, TX (US); Daniel R. Bersak, Astoria, NY (US); Sandip Pandey, Piscataway, NJ (US); Ella Saar, Closter, NJ (US); Trenton J. Duke, Richardson, TX (US)

(73) Assignee: Walmart Apollo, LLC, Bentonville, AR (US)

( * ) Notice: Subject to any disclaimer, the term of this patent is extended or adjusted under 35 U.S.C. 154(b) by 385 days.

(21) Appl. No.: 17/868,195

(22) Filed: Jul. 19, 2022

(65) Prior Publication Data
US 2024/0029400 A1 Jan. 25, 2024

(51) Int. Cl.
*G06V 10/764* (2022.01)
*G06Q 30/0601* (2023.01)

(52) U.S. Cl.
CPC ....... *G06V 10/764* (2022.01); *G06Q 30/0625* (2013.01)

(58) Field of Classification Search
CPC ............. G06Q 30/0625; G06V 10/764; G06V 10/7788; G06V 20/52
See application file for complete search history.

(56) References Cited

U.S. PATENT DOCUMENTS 10,266,196 B1 4/2019 Sinha
10,872,326 B2 12/2020 Garner
(Continued)

OTHER PUBLICATIONS

Albrecht, Chris; "WalkOut Retrofits Shopping Carts with Cameras and Screens for Cashierless Checkout"; <https://thespoon.tech/walkout-retrofits-shopping-carts-with-cameras-and-screens-for-cashierless-checkout/>; May 26, 2021; 8 pages.
(Continued)

*Primary Examiner* — Ruiping Li
(74) *Attorney, Agent, or Firm* — Fitch, Even, Tabin & Flannery LLP

(57) ABSTRACT

Some embodiments provide retail inventory identification systems, comprising: a mobile product mapping system comprising: a transport system, a tower housing, and a cluster processing system comprising: a plurality of product identifying (PI) systems each in different orientations and directed along different fields of view, and a mobile control circuit; wherein the PI systems each comprise an image capture system, and a location determination system, wherein each of the plurality of PI systems is configured to: capture images of products supported on product support systems; and locally process the images comprising applying a plurality of different machine learning modeling techniques, to infer identification of multiple products and generate product identifying information in association with location information; and the mobile control circuit is configured to generate product identifying mapping of products as the product mapping system moves; and communicate the generated product identifying mapping to an inventory management system.

20 Claims, 10 Drawing Sheets

(56) References Cited

U.S. PATENT DOCUMENTS

| | | |
|---|---|---|
| 11,074,637 B2 | 7/2021 | Davis |
| 11,288,693 B2 | 3/2022 | Bronicki |
| 11,443,337 B2* | 9/2022 | Bronicki ................ G06V 20/10 |
| 2018/0218494 A1 | 8/2018 | Chaubard |
| 2020/0273013 A1* | 8/2020 | Garner ................ G06F 18/2148 |
| 2021/0110371 A1 | 4/2021 | Garner |
| 2021/0192162 A1 | 6/2021 | Rodriguez |
| 2021/0319195 A1 | 10/2021 | Chakravarty |
| 2021/0350555 A1 | 11/2021 | Fischetti |
| 2022/0083959 A1* | 3/2022 | Skaff ....................... H04N 7/18 |

OTHER PUBLICATIONS

Perishable News; "WalkOut's Frictionless Smart Cart Tech Scans Groceries as Shoppers Load Them"; <https://www.perishablenews.com/retailfoodservice/walkouts-frictionless-smart-cart-tech-scans-groceries-as-shoppers-load-them/>; May 13, 2021; 2 pages.

* cited by examiner

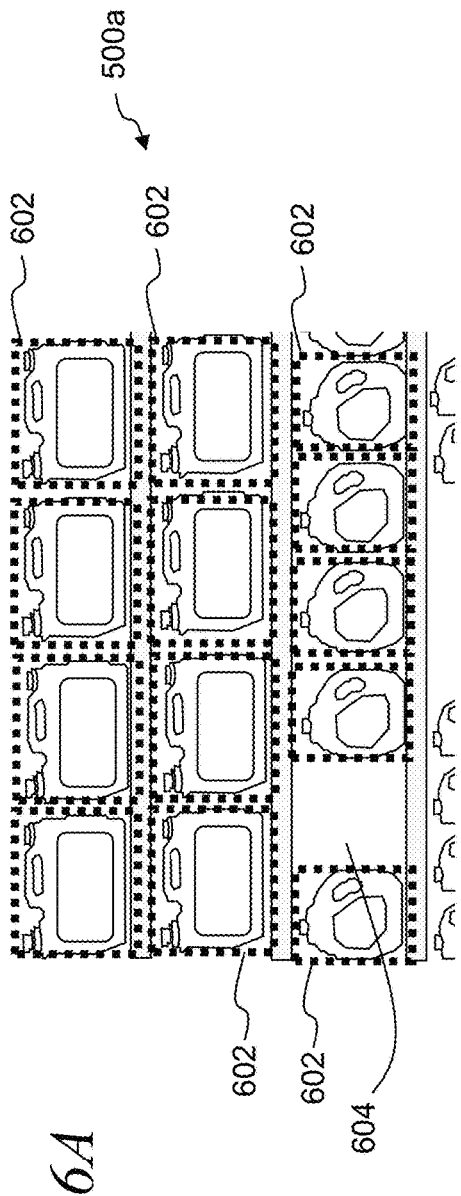
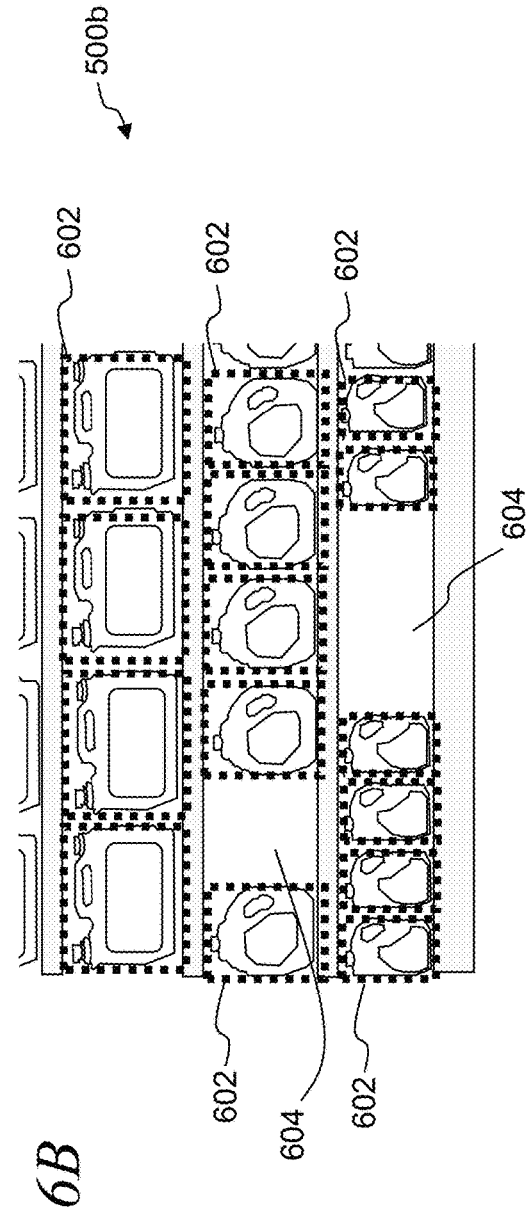
FIG. 6A
FIG. 6B

SYSTEMS AND METHODS FOR ON-DEVICE OBJECT RECOGNITION VIA MOBILE DEVICE CLUSTER

TECHNICAL FIELD

This invention relates generally to image processing.

BACKGROUND

The identification of objects can be difficult when attempting to identify products through captured images. Typically imaging systems are incapable of identifying objects. Previous systems utilized significant image processing capabilities in attempts to identify products.

BRIEF DESCRIPTION OF THE DRAWINGS

Disclosed herein are embodiments of systems, apparatuses and methods pertaining to image processing to provide product identification. This description includes drawings, wherein:

FIG. 6A illustrates a simplified representation of the exemplary image of FIG. 5A with representations of bounding boarders, in accordance with some embodiments.

FIG. 6B illustrates a simplified representation of the exemplary image of FIG. 5B with representations of bounding boarders, in accordance with some embodiments.

Figure 1:
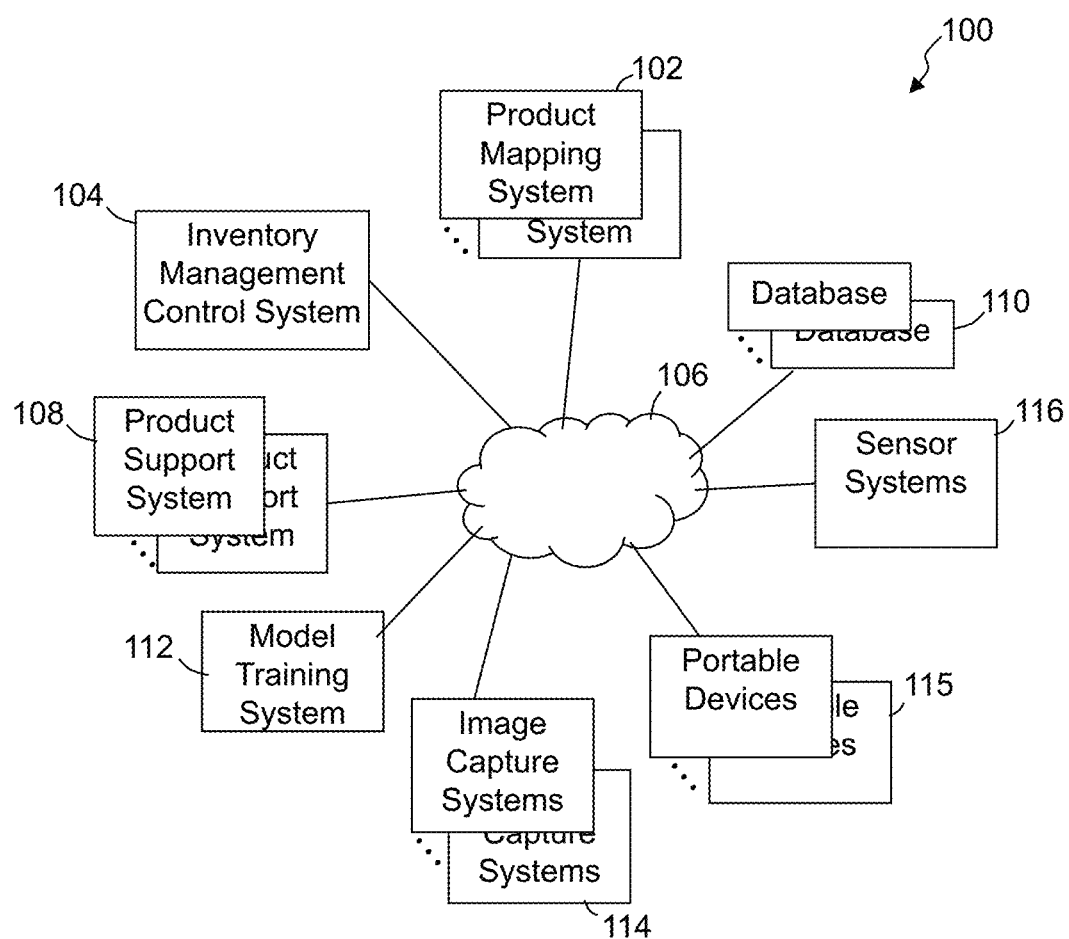
FIG. 1 illustrates a simplified block diagram of an exemplary retail inventory identification system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Some embodiments provide improved automated inventory identification and inventory mapping at one or more retail facilities. The inventory mapping is achieved in part through the cooperative operation of inventory scanning on a device scanning cluster of multiple mobile systems that capture images of products distributed throughout the retail facility, and locally and individually processing those images to identify products. The images can be individual images and/or frames of video content captured by image capture systems of the respective mobile systems. Product identification information in cooperation with location information of the respective identified product from the multiple systems is utilized to map the location of products throughout one or more portions of the respective retail facility.

In some embodiments, a retail inventory identification system is provided that includes one or more mobile product mapping systems that are configured to move throughout a retail facility. One or more, and typically each product mapping system, in some embodiments, comprises a transport system enabling the product mapping system to be moved through the retail facility, a tower housing, and a cluster processing system. The cluster processing system includes a plurality of product identifying (PI) systems secured with the tower housing with each of the plurality of PI systems in different orientations each directed along a different field of view, and a mobile control circuit communicatively coupled with each of the plurality of PI systems. Each of the plurality of PI systems has an image capture system, and a location determination system configured to track a location within the retail facility of the respective PI system in association with images captured by the image capture system.

The plurality of PI systems are configured to cooperatively and simultaneously operate. Further, each of the plurality of PI systems is configured to: capture, by the image capture system, images of multiple different products supported on product support systems within the retail facility; and locally process the respective images comprising applying a plurality of different machine learning modeling techniques to at least a portion of each of the images, to infer an identification of multiple products on one or more of the product support systems and generate product identifying information of the multiple products in association with location information of each of the multiple products. The mobile control circuit is configured to receive the product identifying information from each of the plurality of PI systems, and generate, from the received product identifying information and without utilizing the images from the plurality of PI systems, product identifying mapping of the products being supported by the product support systems captured in the images by the plurality of PI systems as the product mapping system moves along a portion of the retail facility wherein the product identifying mapping comprises for each inferred identified product a product identifier and location coordinates of the inferred identified product. In some implementations, the mobile control circuit communicates the generated product identifying mapping to a central inventory management control system.

Some embodiments provide methods and/or processes of retail inventory identification. A location of a mobile product mapping system can be tracked as the product mapping system is controlled to move within a retail facility. The product mapping system comprises a tower housing and a cluster processing system comprising a plurality of product identifying (PI) systems secured with the tower housing with each of the plurality of product identifying systems in different orientations each directed along a different field of view. The plurality of PI systems cooperatively and simultaneously operating to capture, by a respective image capture system of each of the plurality of PI systems, images of multiple different products supported on product support systems within the retail facility. The respective images are locally processing by each of the plurality of PI systems. In some implementations, the local processing of the images comprising applying a plurality of different machine learning modeling techniques to at least a portion of each of the images and inferring an identification of multiple products on one or more of the product support systems; and generating product identifying information of the multiple products in association with location information of each of the multiple products. A mobile control circuit of the product mapping system can receive, in real time as the product mapping system is moved within the retail facility, the product identifying information from each of the plurality of PI systems. From the received product identifying information and without utilizing the images from the plurality of PI systems, product identifying mapping is generated of the products being supported by the product support systems captured in the images by the plurality of PI systems as the product mapping system moves along a portion of the retail facility. The product identifying mapping comprises for each inferred identified product a product identifier and location coordinates of the identified product. Some embodiments further communicate the generated product identifying mapping to a central inventory management control system and/or one or more other systems separate from the PI system.

FIG. 1 illustrates a simplified block diagram of an exemplary retail inventory identification system 100, in accordance with some embodiments. The retail inventory identification system 100 includes one or more mobile product mapping systems 102, an inventory management control system 104 in communication with the one or more mobile product mapping systems 102 over one or more wired and/or wireless communication and/or computer networks 106 (e.g., LAN, WLAN, cellular, Wi-Fi, Bluetooth, Internet, LoRa, LoRaWAN, other such networks or a combination of two or more of such wired and/or wireless networks). The inventory management control system can track inventory levels of products of one or more retail facilities, manage and/or adjust inventory, track shipping and/or other such functions. The inventory management control system can be implemented through one or more processors, microprocessors, computers, servers and/or other such computational systems. Further, the inventory management control system can be implemented local at a retail facility, or geographically distributed over the network 106 (e.g., distributed over the Internet).

One or more databases 110 are communicatively coupled with the network 106 storing information, models, applications and the like for use by the inventory identification system 100. For example, the databases typically include one or more machine learning model databases that store trained, retrained and/or historic machine learning models utilized by the inventory identification system 100. Further, embodiments typically further include one or more inventory databases maintaining inventory information of products carried, intended to be carried, previously carried and/or predicted to be carried at one or more retail facilities. The inventory databases and/or one or more separate mapping databases can, in some embodiments, store and repeatedly update over time inventory mapping information determined by one or more product mapping systems 102. The inventory identification system 100, in some embodiments, further includes a model training system 112 that utilizes historic and/or current inventory and/or product information (e.g., known product images captured at known parameters (e.g., at known distance, with known zoom, etc.), known product dimensions, and other information in training one or more machine learning models and/or modeling techniques and repeatedly retrain such machine learning modeling techniques over time. Some embodiments further receive feedback information (e.g., customer purchases, notification of incorrect identification, corrected identification, etc.) that is utilized by the model training system 112.

In some embodiments, the retail inventory identification system 100 includes one or more additional image capture systems 114 positioned at locations throughout the retail facility that can communicate with one or more product mapping systems 102 and/or a central system. These additional image capture systems, in some implementations, can operate as a stationary PI system to perform local image processing, apply machine learning models and provide product identifying information. Some embodiments include and/or communicatively couple over one or more of the communication networks 106 with one or more portable devices 115 carried by facility associates, customers (e.g., retail facility supplied and/or personal smartphones), part of one or more unmanned vehicles, and/or other such portable devices. These portable devices 115 can include one or more image capture systems. One or more sensors 116 can provide additional information, such as position of product mapping system 102, position of an associate of the retail facility, movement information, identifying information (e.g., RFID tag reader sensor system, optical code reader sensor system, etc.), and/or other such sensors. Typically, the inventory identification system 100 includes and/or couples with one or more databases that maintain information about products, customers, inventory, associates, other such information, or a combination of two or more of such information.

The one or more mobile product mapping systems 102 are each configured to move through a facility (e.g., retail store, retail fulfillment center, retail warehouse, a parts distribution facility, and/or other such facilities maintaining an inventory of products and/or items) along and/or adjacent one or more product support systems 108 that are configured to support one or more different products and/or items. In a retail facility, for example, the product support systems 108 can include one or more of shelving units, modulars, racks, displays, and/or other such devices that support products to be sold through the retail facility.

Figure 2:
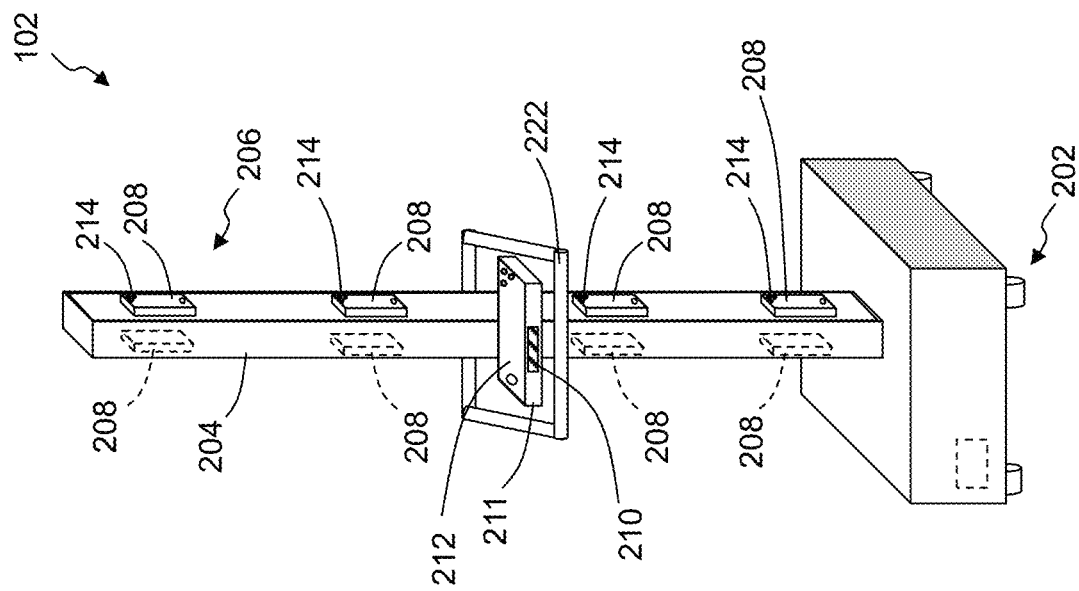
FIG. 2 illustrates a simplified block diagram of an exemplary product mapping systems, in accordance with some embodiments.

FIG. 2 illustrates a simplified block diagram of an exemplary product mapping systems 102, in accordance with some embodiments. The product mapping systems 102 are configured to move through the retail facility and locally identify products supported on the product support systems 108. The product mapping system 102 includes a transport system 202 that enables the product mapping system to be moved through a retail facility. The transport system can include one or more wheels, continuous track or treads, tracks, rollers and/or other mechanisms that allow movement. In some implementations, one or more transport motors can be cooperated with the wheels or other transport mechanism.

The product mapping system 102 further includes a tower housing 204 or other structure that is configured to support a cluster processing system 206 that includes a plurality of product identifying (PI) systems 208 that are secured with the tower housing 204. The cluster processing system 206, in some implementations, includes one or more mobile control circuits 210 that communicatively couples with the plurality of PI systems 208. The cluster processing system 206 can include one or more user interfaces 212 coupled with the mobile control circuit 210 and that is configured to provide information to one or more users and/or receive input from one or more users. In some embodiments, the mobile control circuit 210 is part of one or more of the PI systems 208 that is acting as a mobile control system of the product mapping system 102, while in other implementations the mobile control circuit 210 is part of a mobile control system 211 that is communicatively coupled with but separate from the PI systems 208. The mobile control circuit 210 can be implemented through one or more processors, microprocessors, control logic, and memory storing code that is executed by the one or more processors and/or microprocessors. In other implementations, the tower housing 204 can be removably cooperated with a shopping cart or other such device that enables the PI systems to be moved through one or more portions of the retail facility.

In some embodiments, the product mapping system 102 includes one or more handles 222, steering wheels and/or other such mechanisms that can be used by a user to push, pull, and/or control a direction of travel of the product mapping system. The mobile control circuit 210 can provide directions to a user, for example, through the display of the user interface 212, audibly through an audio system, through other indicators (e.g., LED lights, LED screen, touch screen, etc.), other such methods or a combination of two or more of such methods. Alternatively or additionally, the mobile control circuit 210 can control the transport system 202 (e.g., one or more motors, one or more steering mechanisms, etc.) to autonomously control the movement of the product mapping system 102. The mobile control circuit 210, in some embodiments, can receive the location coordinates from one or more of the PI systems and determine, based on the location coordinates, path correction instructions to be implemented as the product mapping system is transported through the retail facility and control the product mapping system in causing the path correction instructions to be implemented. For example, path correction feedback can be provided to a user (e.g., a retail facility association pushing the product mapping system 102). In some embodiments, one or more or each of the PI systems 208 include a location sensor system configured to identify location coordinates of the respective PI system as the product mapping system 102 is transported through the retail facility.

Each of the plurality of PI systems 208 includes one or more image capture systems 214, which can include one or more digital cameras, arrays of optical sensors and/or other such image capture systems. One or more of the PI systems 208 and/or the mobile control circuit can include and/or couple with one or more location determination systems that are configured to track a location within the retail facility of the respective PI system in association with images captured by the image capture system 214. In some embodiments, each of the plurality of PI systems 208 is positioned in a different orientation relative to the other PI systems 208 each directed along a different fields of view. This allows the cluster processing system 206 to cooperatively and/or simultaneously operate the plurality of PI systems 208 to capture images of different areas of one or more product support systems 108 as the product mapping system 102 is moved through at least a portion of the retail facility. The images can be individual images and/or frames of video content captured by the image capture systems. Some embodiments utilize multiple frames of video content in attempts to increase a probability of the accuracy of the inferred identification of the product. In some embodiments, the PI systems 208 and/or the mobile control system are each implemented through a respective smartphone, tablet, or other such portable handheld user device that is inserted into and/or otherwise affixed with the tower housing 204.

While the above and below generally describe the PI systems 208 and/or mobile control system 211 as being implemented through smartphones and/or tablets, it will be appreciated by those skilled in the art that the PI systems can be alternatively or additionally implemented through other systems capable of identifying products and their location within the retail facility. The PI systems can be configured to implement one or more applications (APPs) to utilize the image capture system and image processing to identify products. Typically, the product mapping system 102 is device agnostic enabling substantially any relevant smartphone, tablet, laptop and/or other system that can implement the relevant one or more applications in cooperation with the images captured by the respective PI system and execute the machine learning models and/or other product identification applications. The inference of product identification is typically performed on the PI systems 208 without having to communicate the images and/or other information for processing by external systems to identify products. It will be appreciated that the images, image data and/or other relevant information may be communicated to an external system for other uses, such as later evaluation of accuracy of the PI systems, retraining of models, updating databases, and/or other such utilizations. Further, in some embodiments, the cluster processing system 206 enables one or more of the PI systems 208 and/or mobile control system 211 to communicate with one or more of the other PI systems and/or the mobile control system. The communication can enable synchronization between PI systems, distributed processing of image data, distributed memory utilization and/or other such benefits. Typically, the mobile control system combines product identifying data from the cluster processing system 206, and in some instances can communicate some or all of the product mapping to other systems over one or more distributed communication networks. In some instances, this uploading of product mapping can occur at a later time when the product mapping system 102 is docket, connected through a wired connection, when no longer attempting to identify products, and/or other instances. In other embodiments, however, some or all of the product mapping can be communicated from the cluster processing system 206 at substantially any time. Some embodiments utilize a messaging system between product mapping systems 102 and/or PI systems 208 to share data, share device health information, provide remote configuration, implement data queries and/or other such functionality.

In some embodiments, the PI systems 208 each include one or more tangible memory, and a decision control circuit communicatively coupled with the memory. The image processing circuit is configured to process images, select and extract a subset of frames comprising one or more individual frames from a series of frames of a video content, and/or other image processing. The tangible memory is typically positioned within a housing of the PI system. In some embodiments, the memory stores a local product database locally storing sets of product imaging data, with each set of product imaging data corresponding to one of hundreds to hundreds of thousands of different retail products available from a retail facility. Images typically capture imaging data that includes a product identifier or identifying information, and at least image attribute data exclusively corresponding to the respective product. In some embodiments, the PI systems are configured to: process images by multiple machine learning modeling techniques based on one or more attributes and obtain for each modeling technique corresponding product an identification probability that a product, captured within each of the one or more images or frames, is estimated to be a first product of the hundreds to thousands of products. In some implementations, the image processing can include determining an aggregated identification probability of the first product as a function of the multiple product identification probabilities corresponding to the one or more images and/or frames captured. The aggregated identification probabilities of the first product for the one or more images and/or frames can be collectively evaluated to identify when one or more of the aggregated identification probabilities has a predefined relationship with a collective threshold probability, and designate the inferred identification based on the identification probability having the threshold relationship with the collective threshold probability.

Figure 3:
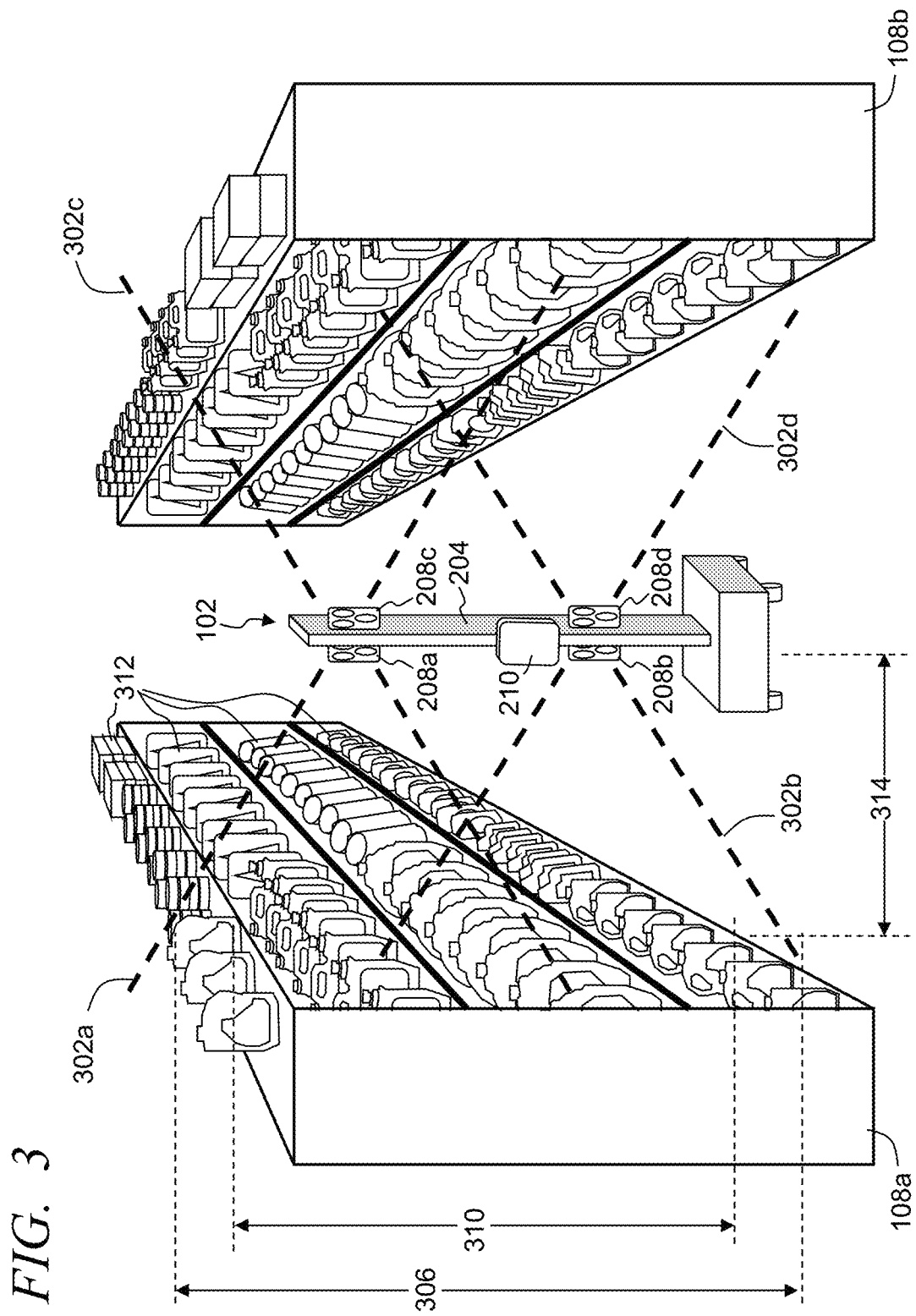
FIG. 3 illustrates a simplified block diagram of an exemplary product mapping system, in accordance with some embodiments, positioned relative to product support systems.

FIG. 3 illustrates a simplified block diagram of an exemplary product mapping system 102, in accordance with some embodiments, positioned relative to product support systems 108a-108b. Referring to FIGS. 1-3, the product mapping system 102 includes the multiple PI systems 208a-208d positioned so that each PI system 208a-208d has a different orientation of their field of view 302a-302d of at least one camera system than fields of view of other PI systems 208 of the product mapping system 102. The PI systems 208 can further be configured such that fields of view 302 of one or more PI systems can overlap so that collectively images are captured of the products 312 on the product support system 108 without gaps.

In some embodiments, a cooperative or summation of the vertical dimensions of the fields of view of multiple PI systems (e.g., a cooperative vertical dimension 306 of a field of view 302a of a first PI systems 208a, and a field of view 302b of a second PI systems 208b) is configured to and/or is adjusted to cover the vertical dimension 310 of the product support system 108a and products 312 positioned on the product support system with the product mapping system 102 at a distance 314 from the respective product support system 108. For example, the distance may be measured by one or more sensors of the product mapping system 102, image processing (e.g., based on known dimensions of one or more aspects of the product support system and/or products, determined based on markings (e.g., on the floor, on the product support system, etc.), and/or other such methods. Further, in some implementations, products may be stored on top of or on a top level of a product support system 108, sometimes referred to as Top Stock. Further, in some instances, some or all of the products stored on the product support system and/or a top level may be a collection of products (e.g., cases of products, pallets of products, pallets of cases of products, products shrink-wrapped together, other such collections of products, or a combination of two or more collections of products). As such, in some embodiments, the product mapping system 102 can include one or more PI systems 208 and/or adjust the fields of view 302 of one or more PI systems to capture images and enable the identification of products in the Top Stock via product recognition, barcode detection, text recognition, machine learning modeling techniques, other such identification, or a combination of two or more of such identification methods as described above and below.

Further, in some embodiments, each of the plurality of PI systems 208 of a product mapping system 102 is configured to utilize one or more respective the image capture systems 214 to capture images of multiple different products 312 supported on product support systems 108 within the retail facility. As the product mapping system 102 moves, different products are captured in images as the fields of view of the image capture systems are moved along the product support system. In some implementations, one or more of the PI systems can activate multiple different camera systems simultaneously and/or in a sequence. As one non-limiting example, a PI system may activate a first image capture system to capture images used to identify products, activate a second image capture system to capture images that are configured to be processed to identify product labels on front faces of one or more shelves of a product support system, and activate a third image capture system having a different field of view than the first image capture system to capture images used to additionally identify products.

In some embodiments, each PI system 208 is configured, through one or more image processing systems and/or control circuits, to locally process the respective images captured. The image processing, in some implementations, includes applying one or more, and typically two or more different machine learning modeling techniques to at least a portion of each of the captured images to identify multiple products 312 on the one or more product support systems 108. Examples of the machine learning modeling techniques can include, but are not limited to YoloV5, MobileNetv2, EfficientNetv2, DeepSort, other such techniques, and typically a combination of such techniques executed on each of the product mapping systems 102. For example, the trained learning models may include TENSORFLOWLITE model, a MOBILENETV2 model, ML KIT for FIREBASE, known barcode modeling applications, known OCR modeling applications, and substantially any other relevant modeling and supporting applications (e.g., CORE ML, VISION FRAMEWORK, CAFFE, KERAS, XGBOOST, TENSOR- FLOW, etc.). Further, one or more of the modeling techniques may apply one or more filters and other such processing. In some embodiments, for example, the modeling can apply a series or sequence of multiple filters to narrow the potential product with which the product in an image potentially corresponds. Filtering and/or successive filtering can narrow the pool of potential products. The filtering can include shape filtering, color filtering, boarder and/or boundary filtering, other such filtering, and typically a combination of two or more of such filtering. For example, in some embodiments, one or more of the models can apply a convolutions neural network application. In some applications, the object classification modeling and/or one or more of the other modeling may be implemented through modelings that are available through third party sources and/or vendors, such as but not limited to MobileNetV2, which may be applied through the TENSORFLOW™ object detection application programming interface (API).

Based on the modeling techniques applied, the PI systems 208 can further perform inference on object detection, UPC prediction, occlusion filtering, text capture, other such identification methods or a combination of two or more of such identification methods to generate product identifying information of the multiple products 312 within one or more captured images. Some embodiments, in identifying individual products applies one or more machine learning models to extracted image data. For example, some embodiments apply some or all of one or more systems and/or processes described in U.S. Pat. No. 10,872,326, entitled SYSTEMS AND METHODS OF PRODUCT RECOGNITION THROUGH MULTI-MODEL IMAGE PROCESSING, which is incorporated herein by reference in its entirety. The image processing can apply multiple different machine learning modeling techniques to one or more portions of captured images to identify, as a function of product identification probabilities, products 312 captured within the images. The PI systems 208 can further identify products within the images in association with determined location information of each of the multiple products. Still further, in some embodiments, the PI systems can respectively use multiple different images from multiple different fields of view in identifying products. Similarly, the PI systems can identify gaps or empty space along a product support system 108 and/or products that are not at a front of a shelf, rack or other support. For example, the gaps can be identified based on a lack of recognizable product information, identification of boundaries of one or more products on one or more sides of a gap, identifying information that is detectable in the absence of products (e.g., a symbol, pattern, barcode, etc. placed at a back of a shelf that can be captured in an image when there is no product blocking that identifying information), and other such methods. Further, in some embodiments, the PI systems are configured to detect when products are not at the front of a shelf or rack, and instead are back with a space between the product and the front of the shelf or rack. This spacing can be detected through image processing, distance measurement systems and/or other such methods.

Typically, the product identification is performed at the respective PI systems 208 without having to communicate images, image data and/or other information to a separate system or a central image processing system. This greatly improves the speed of product identification, significantly reduces network traffic, enables distributed processing of information, provides redundancy, and other benefits. Still further, the utilization of multiple PI systems 208, in some embodiments, enables duplicative processing of overlapping images to provide duplicative product identification as the PI systems 208 move along, past, around and/or other such movement relative to the product support systems 108.

As described above, the mobile control circuit 210 is communicatively coupled with the plurality of PI systems 208. In some embodiments, the mobile control circuit 210 is configured to receive the product identifying information from each of the plurality of PI systems 208, and typically without receiving the images from the plurality of PI systems and/or without the mobile control circuit performing image processing to identify the product. In other implementations, however, some of the image processing of one or more images from one or more of the PI systems 208 may be distributed to the mobile control circuit and/or an image processing system of the mobile control system in providing distributed processing, reducing response time, taking advantage of underutilized processing capabilities of the mobile control circuit, and/or other such reasons. As described above, in some embodiments, the mobile control system 211 can be a same type of smartphone, tablet or other such device used to implement the PI systems 208.

The product identifying information provided to the mobile control circuit 210 can include substantially any relevant information that identifies a particular product. For example, the product identifying information can include a serial number, a barcode number, a UPC number, a product name, a product size, a product weight, a count of items of a product, dimensions of a product, other such information, or a combination of two or more of such information. The foregoing examples are intended to be illustrative and are not intended to convey an exhaustive listing of all possible identifying information. Instead, it will be understood that these teachings will accommodate any of a wide variety of identifying information in a given setting. Further, in some in some embodiments, the product identifying information includes location information of a particular product. In other implementations, location information is provided separate from the product identifying information. The location information can include an identifier of a product support system 108, an identifier of an aisle on which the product is located, a shelf of the product support system, a rack position of the product support system, a shelf location (length and/or depth), two-dimensional coordinates within the retail store, three-dimensional coordinates within the store, global position system (GPS) coordinates, other such information, or a combination of two or more of such location information. As introduced above, in some embodiments, the PI systems 208 are configured to track a location of the PI system as it moves relative to the one or more product support systems 108 and/or determines product locations using one or more methods of tracking location. For example, the PI systems 208 can identify some location information from image processing (e.g., identifying labels on the shelves, identifying products and using known product location information, planogram, etc.), coordinates from a GPS of the PI system, using one or more sensors (e.g., distance measurement sensor(s), accelerometer(s), gyroscope(s), etc.), receiving input from one or more other PI systems 208 and/or the mobile control circuit 210, detecting markers on the floor and/or product support systems, tracking rotations of wheels of the product mapping system 102, other such information, or a combination of two or more of such information. Similarly, locations of products back from a front of a shelf can be detected based on known dimensions of the product and detected variations relative to the depth or distance from the image capture system.

The mobile control circuit 210 is configured to generate, from the received product identifying information, a product identifying mapping of the products being supported by one or more product support systems 108 that were identified from the images captured by the plurality of PI systems 208 as the product mapping system 102 moves along at least a portion of the retail facility. The product identifying mapping provides a mapping of identified products based on their respective locations within the retail facility, and in some implementations comprises for each identified product a product identifier and location coordinates of the identified product. In some embodiments, for example, the product identifying mapping comprises a database associating one or more product identifiers and/or identifying information for each particular product 312 identified and three-dimensional (3D) coordinates within the retail facility of the location of that particular product. In other embodiments, the location information may be defined in association with a position within a particular product support system (e.g., support system-15, shelf-3, and a two-dimensional position on shelf-3). The product mapping system 102 can preform such product mapping through one or more portions of the retail facility and/or multiple product mapping systems 102 can perform product mappings of products in multiple parts of the retail facility. One or more mobile control circuits can collect the information to generate a more complete or fully complete product identifying mapping of the retail facility. Typically, the mobile control circuit 210 generates the product identifying mapping without using the images from the plurality of PI systems.

The generated product identifying mapping can be communicated by the one or more mobile control circuits to one or more separate systems and/or devices for numerous different functions and/or evaluations. In some embodiments, the product identifying mapping is communicated over the distributed network 106 to the central inventory management control system 104 is configured to provide control over inventory at the retail facility, identify quantities of products, determine restocking needs, determine reordering needs, and/or other such determinations.

Further, in some embodiments, the mobile control circuit 210 provide some control over one or more aspects of the PI systems 208. For example, in some implementations, the mobile control circuit can specify control information in adjusting a field of view, which image capture system to utilize, whether a PI system is active, when a PI system is active, which machine learning modeling techniques to apply, camera resolution to be utilized, software upgrades, synchronization of software among PI systems, other such control, or a combination of two or more of such control. As a non-limiting specific example, the mobile control circuit 210 can be configured to control each of the plurality of PI systems 208 in specifying the respective plurality of different machine learning modeling techniques to be applied by the respective PI systems of a set of multiple different machine learning model techniques available to be applied by the respective PI system. In some instances, each PI system applies the same plurality of machine learning modeling techniques, while in other implementations, different PI systems can apply different sets of machine learning modeling techniques. The set of modeling techniques may be learned over time, may be based on the products expected to be identifying (e.g., based on a planogram specifying expected locations of products), may be based on measured and/or expected customer traffic and/or other traffic, processing capabilities of the PI systems, limits on time to perform the product identifying mapping, other such factors, or a combination of two or more of such factors.

Figure 4:
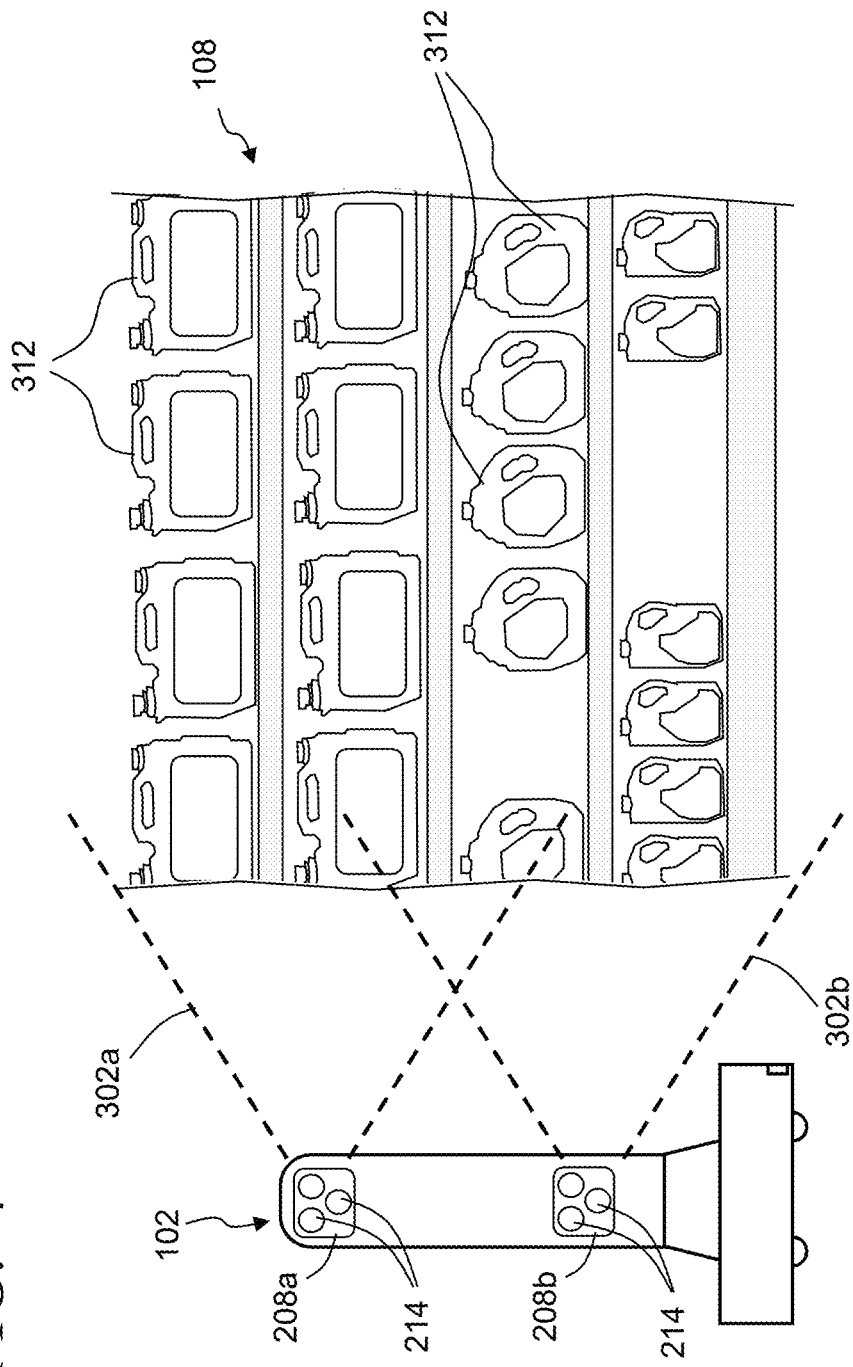
FIG. 4 illustrates a simplified block diagram of an exemplary product mapping system positioned adjacent a product support system, in accordance with some embodiments.

In some embodiments, when identifying products within the captured images, each of the PI systems 208 is configured to locally process the respective images to define a series of bounding boarders that is associated with and represents a location within the respective image of a product 312 of a set of products captured in the respective image. FIG. 4 illustrates a simplified block diagram of an exemplary product mapping system 102 positioned adjacent a product support system 108, in accordance with some embodiments. The product mapping system 102 includes multiple PI systems 208 positioned to have different fields of view 302. In some embodiments, the PI systems 208 are configured so that the fields of view 302 overlap. The PI systems 208 capture images, in some implementations, of the product support 108 and the products 312.

Figure 5A:
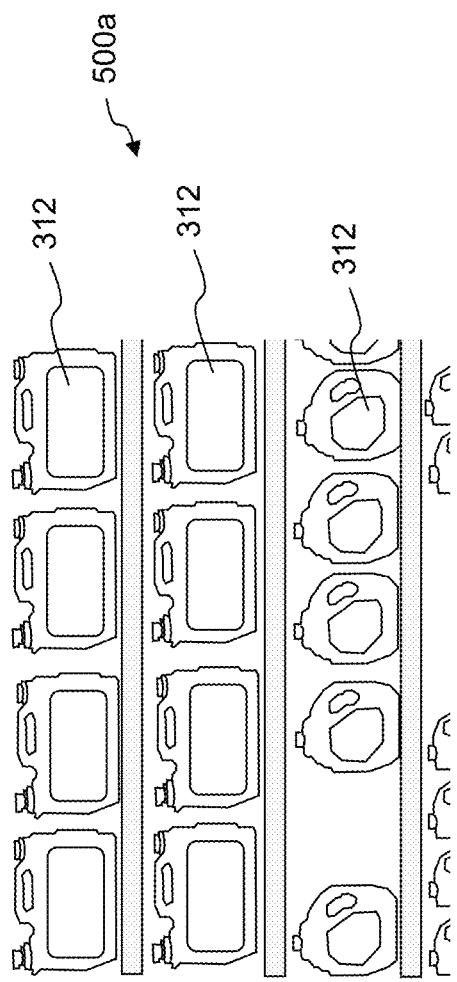
FIGS. 5A-5B illustrate simplified block diagram representations of at least a portion of exemplary images captured by a first product identification system and a second product identification system respectively, based on corresponding fields of view, in accordance with some embodiments.
Figure 5B:
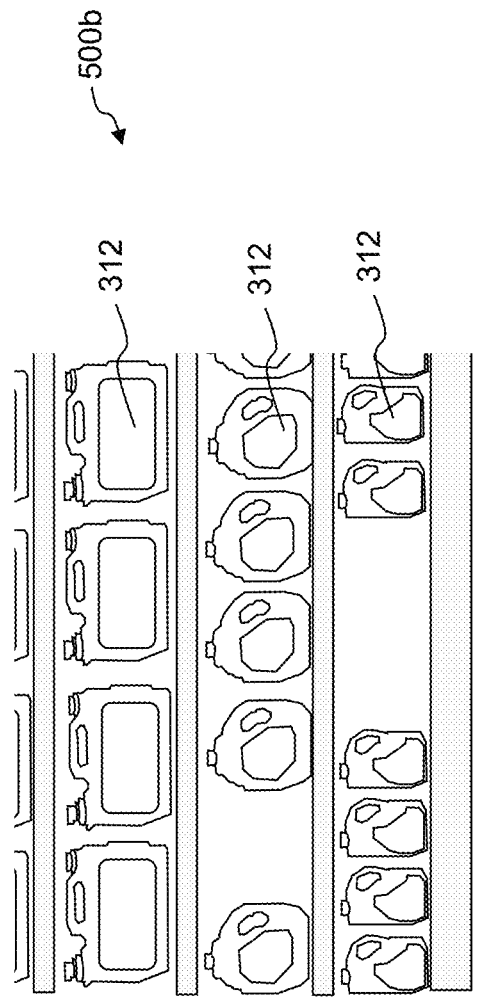

FIG. 5A illustrates a simplified block diagram representation of at least a portion of an exemplary image 500a captured by a first PI system 208a of FIG. 4 based on the corresponding field of view 302a, in accordance with some embodiments. FIG. 5B illustrates a simplified representation of at least a portion of an exemplary image 500b captured by a second PI system 208b of FIG. 4 based on the corresponding field of view 302b, in accordance with some embodiments. Referring to FIGS. 4-5B, in some embodiments, the fields of view 302 are configured to provide overlap to ensure corresponding images capture all of the products on the product support system 108.

The image processing system of the respective PI systems, in some embodiments, is configured to locally process the respective images and/or image data to define a series of bounding boarders or boxes that are each associated with and represent a location within the respective image of a product of a set of products captured in the respective image. These bounding boarders distinguish between different products on the product support system.

FIG. 6A illustrates a simplified representation of the exemplary image 500a of FIG. 5A with representations of bounding boarders 602 defined about products within the image 500a captured by the first PI system 208a of FIG. 4, in accordance with some embodiments. FIG. 6B illustrates a simplified representation of the exemplary image 500b of FIG. 5B with representations of bounding boarders 602 defined about products within the image 500b captured by the second PI system 208b of FIG. 4, in accordance with some embodiments. While the bounding boarders in FIGS. 6A-6B are illustrated as rectangular or square, it will be appreciated that the bounding boarders are not limited to rectangular and/or square, but can instead have other shapes. The shapes may be based on expected products, detected product edges, and/or other such information. The image processing system of the PI systems, in some embodiments, apply edge detection to identify boundaries of products in specifying and/or establish the bounding boarders 602. Additionally or alternatively, the image processing can utilize known product dimensions, known color schemes and/or patters of the products, known labeling and/or other such characteristics of products in distinguishing between products and defining the bounding boarders 602. In some embodiments, the PI systems define bounding boarders for each item that is distinguished within an image. Further, the PI systems in some embodiments can use the bounding boarders 602 to identify at least two-dimensional coordinates of the bounding boarders and/or products associated with each bounding boarder. Further, the bounding boarders and/or coordinates of the bounding boarders in cooperation with product support system location data, predicted product identifying information (e.g., UPC, barcode, etc., which may be based on a planogram of expected products) can be used by the PI systems to detect products captured in images.

Some embodiments further identify gaps or empty spacings 604 where products have been removed (e.g., purchased, collected for delivery, removed because of damage, removed because of expiration, etc.) based on one or more factors. For example, the PI systems can detect a lack of recognizable product information, product labeling, identification of edges or boundaries of one or more products on one or more sides of a gap, identifying information that is detectable in the absence of products (e.g., a symbol, pattern, barcode, etc. placed at a back of a shelf that can be captured in an image when there is no product blocking that identifying information), and other such methods. Further, in some embodiments the PI systems 208 can be configured to predict a number of products and/or facings missing from the empty space 604 (out of shelf availability and/or certain facings) for one or more give products based on one or more factors and/or identifying information such as but not limited to price labels, shelf labels, product dimension(s), planogram information, realogram information and/or other such information.

Figure 7A:
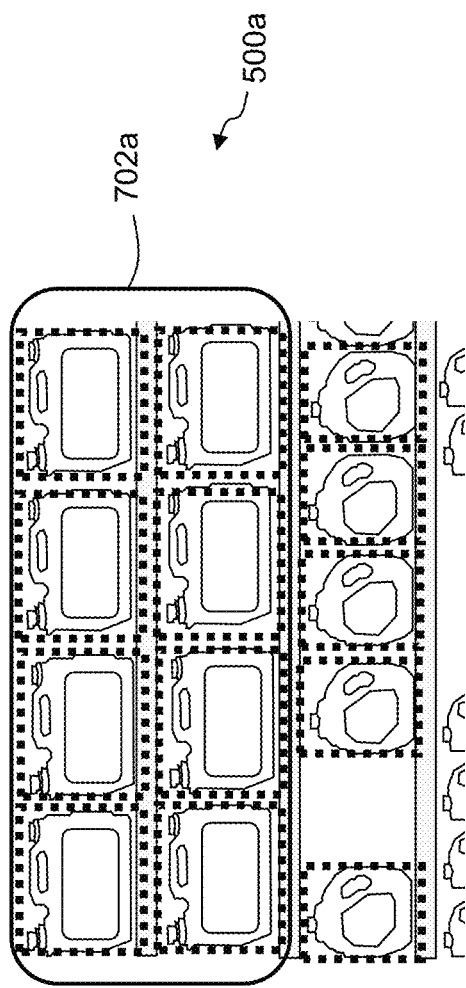
FIG. 7A illustrates a simplified representation of the exemplary image of FIG. 5A with representations of a filtering defined about a region of products within the image, in accordance with some embodiments.
Figure 7B:
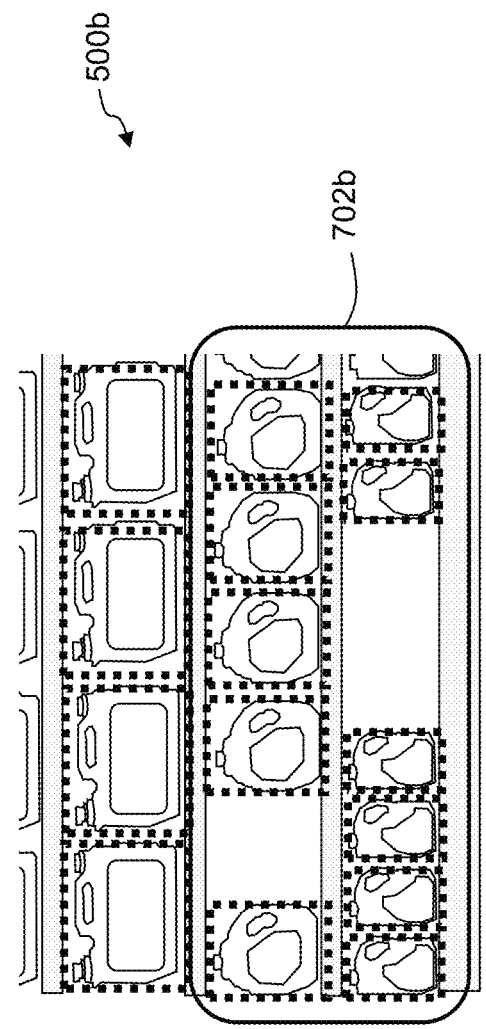
FIG. 7B illustrates a simplified representation of the exemplary image of FIG. 5B with representations of a filtering defined about a region of products within the image, in accordance with some embodiments.

In some embodiments, one or more or each of the PI systems 208 is configured to filter the image data based on a known orientation of the respective image capture system 214 and the corresponding known respective field of view 302 to restrict processing of a subset of the image data corresponding to a predefined vertical portion of the field of view that limits image processing of vertical overlap of respective fields of view between two or more of the PI systems 208. FIG. 7A illustrates a simplified representation of the exemplary image 500a of FIG. 5A with representations of a filtering 702a defined about a region of products within the image 500a captured by the first PI system 208a of FIG. 4, in accordance with some embodiments. FIG. 7B illustrates a simplified representation of the exemplary image 500b of FIG. 5B with representations of a filtering 702b defined about a region of products within the image 500b captured by the second PI system 208b of FIG. 4, in accordance with some embodiments. The filtering between images from the neighboring PI systems, in some embodiments, limits (or in some instances may avoid) processing of the overlap between the fields of view 302a, 302b while still detecting all of the products 312 on the product support system. Further, the filtering in some embodiments is applied to the image data in enhancing processing of the image data, improving processing time, and other such benefits.

In some embodiments, based on the bounding boarders, the PI systems 208 crop the image data to extract image data corresponding to what is predicted to be a single product 312. Based on the cropped image data, the PI systems in some embodiments apply the one or more machine learning modeling techniques to obtain a predicted identifier of the product captured in the image. In some embodiments, some or more of the images can be cropped based on the bounding boarders 602 corresponding to individual products. Those cropped images and/or cropped image data can be used to predict a particular product identification. As described above, in some embodiments the PI systems each locally apply at least one machine learning modeling techniques, and typically multiple machine learning modeling techniques and use results from the machine learning modeling techniques to more accurately determine an expected identification of the products captured in the images. Additionally or alternatively, in some embodiments, the PI systems 208 generate an identifying product vector generated based on one or more factors, such as but not limited to color, color scheme, text recognition, optical scannable features (e.g., barcode, etc.), dimensions, shape, other such characteristics or a combination of two or more of such characteristics. Some embodiments, for example, apply cluster embedding models to identify relationships of contextual embedding, and generate one or more vector representations of the product identification and/or image data. This vector representation can be evaluated relative to other vectorized representations generated from known images of actual products. The correlations between vector representation can be used at least in part in determining a predicted identification of the product captured in the image. In some implementations, product identification information provided from a PI system 208 can include a list of UPC predictions, product name, barcode number, product size, other such information that may distinguish the product or a combination of such information, for every bounding box in the frames of the captured images. As described above, the utilization of multiple PI systems 208 can result in the same product being identified by multiple PI systems. The PI systems, in some embodiments, further identify duplicate product identifying predictions tagged and filtered as described above.

The cooperative processing of the image data form multiple different images captured by different image capture systems and/or at different positions as the product mapping systems 102 is moved along at least a portion of a product support system enable accurate identification of products. In some embodiments, image data and/or product identifying information from multiple images are combined or effectively stitched together to provide product identification and/or count information across at least a portion of the products support system. Still further, as the product mapping system 102 continues to be moved, additional predicted product identifications are determined based on the continued capture of images enabling a generation of a real time inventory mapping of products and their placement within the retail facility, a realogram. Some embodiments utilize multiple product mapping systems 102 moved through different portions of the retail facility each identifying products. The collective results enables the generation of an inventory mapping of some or all of the retail facility, with the inventory mapping defining not just counts of products but precise locations, quantities, states of shelves and other product support systems, and other relevant information that can be used for numerous different retail applications, including at least inventory management, picking management, inventory optimization, other such retail applications and typically a combination of such retail applications.

In some embodiments, different PI systems 208 and/or different image capture systems 214 of a single PI system 208 can be used to capture different images over different fields of view and/or be controlled to capture different images to be used for different functions. For example, one or more PI systems and/or one or more first image capture systems of a PI system can be configured to capture a first field of view to enable product identification, while another PI system directs one or more image capture systems to capture images used to identify shelf labels on front faces of shelves used to help the identification of products, location of the products and/or the product mapping system 102, and/or other such uses. Similarly, another PI system can be used to capture images with a wider angled views in attempts to compensate for something blocking a portion of a product support system. As such, different PI systems and/or different product mapping systems 102 can be used to capture images that can be utilized in cooperation with images used to identify products. Further, for example, in some embodiments a PI system 208 includes at least two image capture systems 214, one used to capture images of products on a product support system, and at least one additional image capture system 214 configured to capture a set of one or more additional images. The PI system can be configured to process the one or more additional images to identify predefined markers on front surfaces of the shelves, and to utilize the identified predefined markers in the inferred identification of the multiple products (e.g., the predefined marker can be an expected shelf label identifying products supported on a shelf, a marking used in determining a location of the PI system that can be used based on a planogram of the retail facility in identifying products), the image capture system can be implemented with different settings (e.g., field of view, focal depth, exposure, and/or other such settings) to capture images for one or more other functions (e.g., used to help identify product edges and/or distinguish between neighboring products (e.g., image capture system with a more zoomed-in view to help identify), used to help define bounding boxes, and/or other such functions), and/or other such uses.

The identification of a location of products in relation to the identification of products enables the inventory identification system 100 to generate an inventory mapping of one or more portions of the retail facility that provides product identification and location information that can be utilized for numerous different functions. In some embodiments, each PI system 208 is further configured to incorporate into the product identifying information a predicted location of each of the multiple products identified in the images. One or more, or each of the PI systems 208, in some implementations comprises a location sensor system configured to identify a current location of the respective PI system 208 in association with each captured image. As described above, the location sensor system can include a GPS system, accelerometer, gyroscope, image processing and/or other such systems to identify locations of the PI systems and/or the products captured in the images. In some embodiments, one or more or each of the PI systems 208 can be configured to access a retail facility planogram defining expected location information of expected products on the product support systems 108, and to use that information to infer the identification of the multiple products as a function of the retail facility planogram and the current location.

Planograms are well understood information used in establishing product placement within a retail facility. In some embodiments, for example, a planogram can include data specifying, in part, where products are located/placed (e.g., product support system identifier, shelf identifier, location where intended to be located on shelves, racks or the like, other such information, or a combination of two or more of such information). The planogram can also include information, such as, the number of each type of item on product support system, shelf, rack, etc., schematics, visual representations of products in a retail facility, diagram/ model indicating assigned location(s) of products, store layout, aisle data and/or aisle location data, other such information, or a combination of such information. Other location information can include three-dimensional coordinates within the retail facility, global positioning information, dimension information, and/or other such information. The aisle location data can additionally or alternatively be used that identifies what types of products are intended to be positioned in each of one or more aisles, what products are on each shelf or rack of each aisle, orientation of shelves of aisles, number of products on each aisle, other such information, or a combination of two or more of such information.

In some embodiments, the product mapping system 102 and/or one or more of the PI systems 208 of the product mapping system 102 further include and/or communicate with one or more location sensor systems configured to identify a current location of the respective PI system 208 and/or product mapping system 102 in association with one or more and typically each captured image. One or more of the PI systems 208 can be configured to access a retail facility planogram defining expected location information of expected products on the product support systems, and infer the identification of the multiple products as a function of the retail facility planogram and the location information. Further, in some embodiments, the mobile control circuit 210 is configured to access the retail facility planogram and generate the product identifying mapping of the products throughout one or more portions of the retail facility as a function of the retail facility planogram in association with the product identifying information.

As described above, in some embodiments, the mobile control circuit 210 provides instructions to cause adjustments and/or direct the movement of the product mapping system 102. In some instances, the instructions can provide path correction feedback to a retail facility association that is pushing the product mapping system 102 and/or moving along with the product mapping system. The product mapping system 102 and/or one or more of the PI systems 208 include one or ore location sensor systems (e.g., one or more distance measurement systems, one or more accelerometers, one or more odometers, one or more global positioning systems, image processing, other sensors, or a combination of two or more of such sensors) configured to identify location coordinates of the respective PI system 208 as the product mapping system 102 is transported through the retail facility. The mobile control circuit 210, in some embodiments, is configured to receive the location coordinates from one or more of the PI systems and/or determine a location based on sensor data. Based on the location coordinates and/or other relevant location information, the mobile control circuit can determine path correction instructions to be implemented as the product mapping system 102 is transported through the retail facility and control the product mapping system in causing the path correction instructions to be implemented. This can include displaying course corrections on a user interface 212 of the mobile control system 211, issuing commands to control one or more steering mechanisms and/or motors of the product mapping system 102, and/or other such actions.

Figure 8:
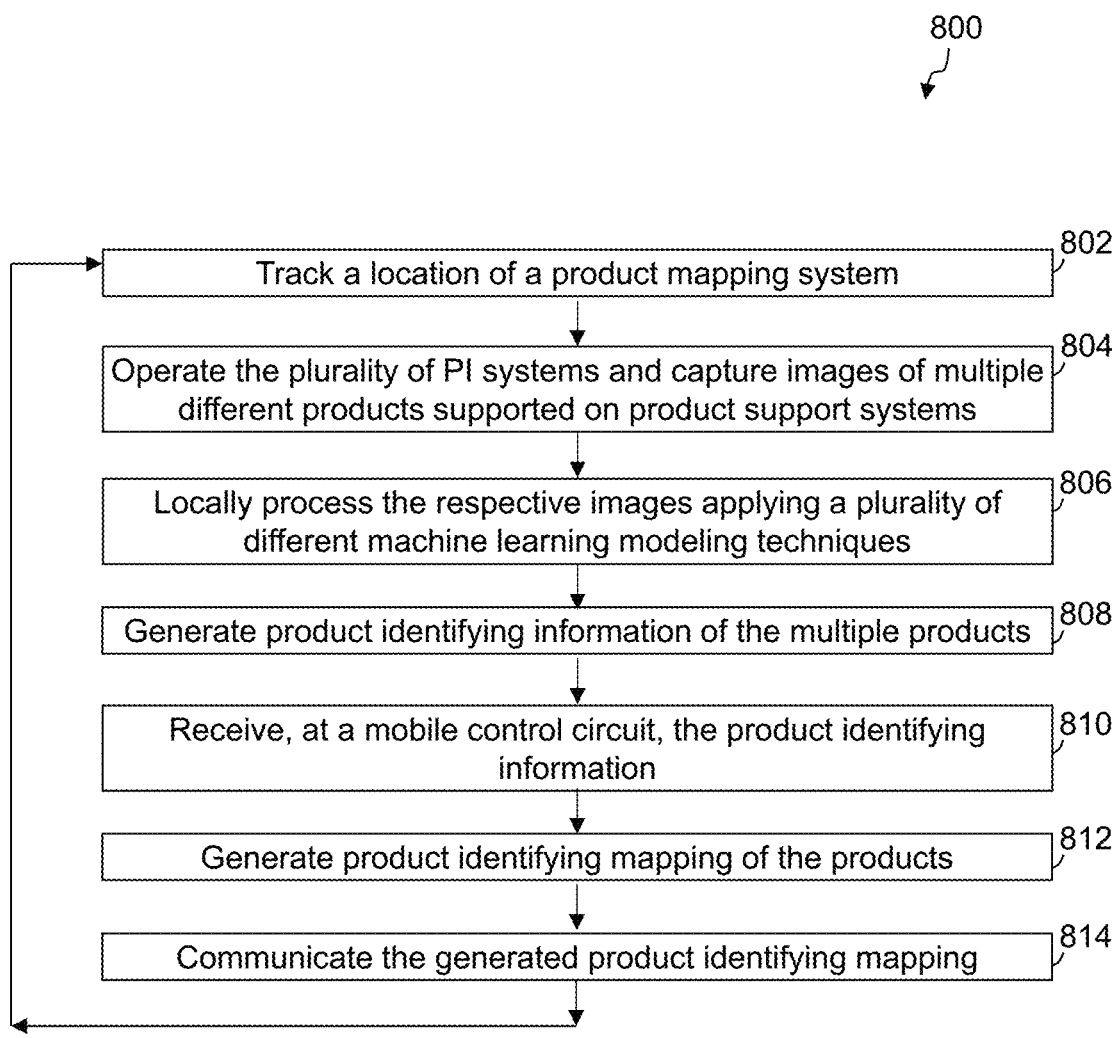
FIG. 8 illustrates a simplified block diagram of an exemplary processes of retail inventory identification, in accordance with some embodiments.

FIG. 8 illustrates a simplified block diagram of an exemplary processes 800 of retail inventory identification, in accordance with some embodiments. In step 802, locations of one or ore mobile product mapping systems 102 are tracked as the product mapping systems are controlled to move within a retail facility. In some embodiments, a cluster processing system 206 is implemented within a tower housing 204. In step 804, a plurality of PI systems 208 of the cluster processing system 206 are cooperatively and simultaneously operated to capture, by respective image capture systems of each of the plurality of PI systems, images of multiple different products supported on product support systems within the retail facility. In some embodiments, the plurality of product identifying systems are positioned in different orientations, and typically having one or more image capture systems oriented along different fields of view.

In step 806, the plurality of PI systems 208 locally processes the respective images captured by the respective PI systems. In some embodiments, the local processing of the images includes applying a plurality of different machine learning modeling techniques to at least a portion of each of the images and identifying multiple products on one or more of the product support systems. The mobile control circuit 210, in some embodiments, controls each of the plurality of PI systems 208 in specifying the respective plurality of different machine learning modeling techniques to be applied by the respective PI systems of a set of multiple different machine learning model techniques available to be applied by the respective PI system. Additionally or alternatively, some embodiments in processing the images define a series of bounding boarders 602 that are each associated with and represents a location within the respective image of a product of a set of products captured in the respective image. Some embodiments receive a set of one or more additional images captured by one or more additional image capture systems of a PI system. These additional images can be processed by the PI system and/or the mobile control circuits 210 to identifying predefined markers on front surfaces of the shelves of a product support system 108. These identified predefined markers can be utilized in the identifying of the multiple products. For example, the predefined markers can provide identifiers of an expected product, location information, and/or other relevant information that can be used in identifying products within the captured images.

In some embodiments, the plurality of PI systems in locally processing the respective images filter the image data based on a known orientation of the respective image capture system 214 and the corresponding known respective field of view in restricting processing of a subset of the image data corresponding to a predefined vertical portion of the field of view that limits image processing of vertical overlap of respective fields of view between two of the PI systems 208. The plurality of PI systems 208 typically further incorporate into the product identifying information a determined, predicted location of each of the multiple products identified in the images. Some embodiments identify, through a location sensor system of each of the PI systems 208, a current location of the respective PI system 208 in association with each captured image. A retail facility planogram defining expected location information of expected products on the product support systems can be accessed by each of the PI systems, and the multiple products can be identified in part as a function of the retail facility planogram and the current location. Additionally or alternatively, some embodiments identify, by a location sensor system of each of the PI systems, location coordinates of the respective PI system as the product mapping system 102 is transported through the retail facility. The mobile control circuit 210 can receive the location coordinates from one or more of the PI systems, and determine, based on the location coordinates, path correction instructions to be implemented as the product mapping system 102 is transported through the retail facility and control the product mapping system in causing the path correction instructions to be implemented.

In step 808 product identifying information is generated of the multiple products captured in the images in association with location information of each of the multiple products. In step 810, one or more mobile control circuits 210 of the product mapping system 102 and in real time as the first product mapping system is moved within the retail facility, receive the product identifying information from each of the plurality of PI systems 208. In step 812, product identifying mapping is generated, from the received product identifying information and without utilizing the images from the plurality of PI systems, of the products 312 being supported by the product support systems 108 captured in the images by the plurality of PI systems 208 as the product mapping system 102 moves along a portion of the retail facility. In some embodiments, the product identifying mapping comprises for each identified product a product identifier and location coordinates of the identified product. In some embodiments, the mobile control circuit 210 accesses a retail facility planogram, and generates the product identifying mapping of the products 312 as a function of the retail facility planogram in association with the product identifying information. Some embodiments include step 814 where the generated product identifying mapping is communicated to a central inventory management control system 104. In some embodiments, one or more of the steps of the process 800 can be repeated any number of times, and/or the process 800 can be repeated. For example, one or more of the steps and/or the entire process 800 can be continuously executed as the product mapping system 102 is moved through one or more portions of the retail facility.

It is noted that the above described embodiments utilize the product mapping systems 102 to identify products and their locations to be used in generating product mapping. Some embodiments additionally or alternatively take advantage of other additional image capture systems 114 positioned at locations throughout the retail facility. These additional image capture systems 114 can be part of portable user devices 115 carried by facility associates and/or customers (e.g., retail facility supplied and/or personal smartphones). Further, one or more image capture systems can be positioned at fixed locations throughout one or more portions of the retail facilities. Images captured by these fixed location image capture systems can similarly be processed by the fixed location image capture system, be forwarded to one or more of the PI systems, the mobile control circuit and/or a central processing system. Product identifying information and location information determined from these fixed position image capture systems can further be utilized in generating the product mapping and/or in confirming product identification and/or product location determination.

Figure 9:
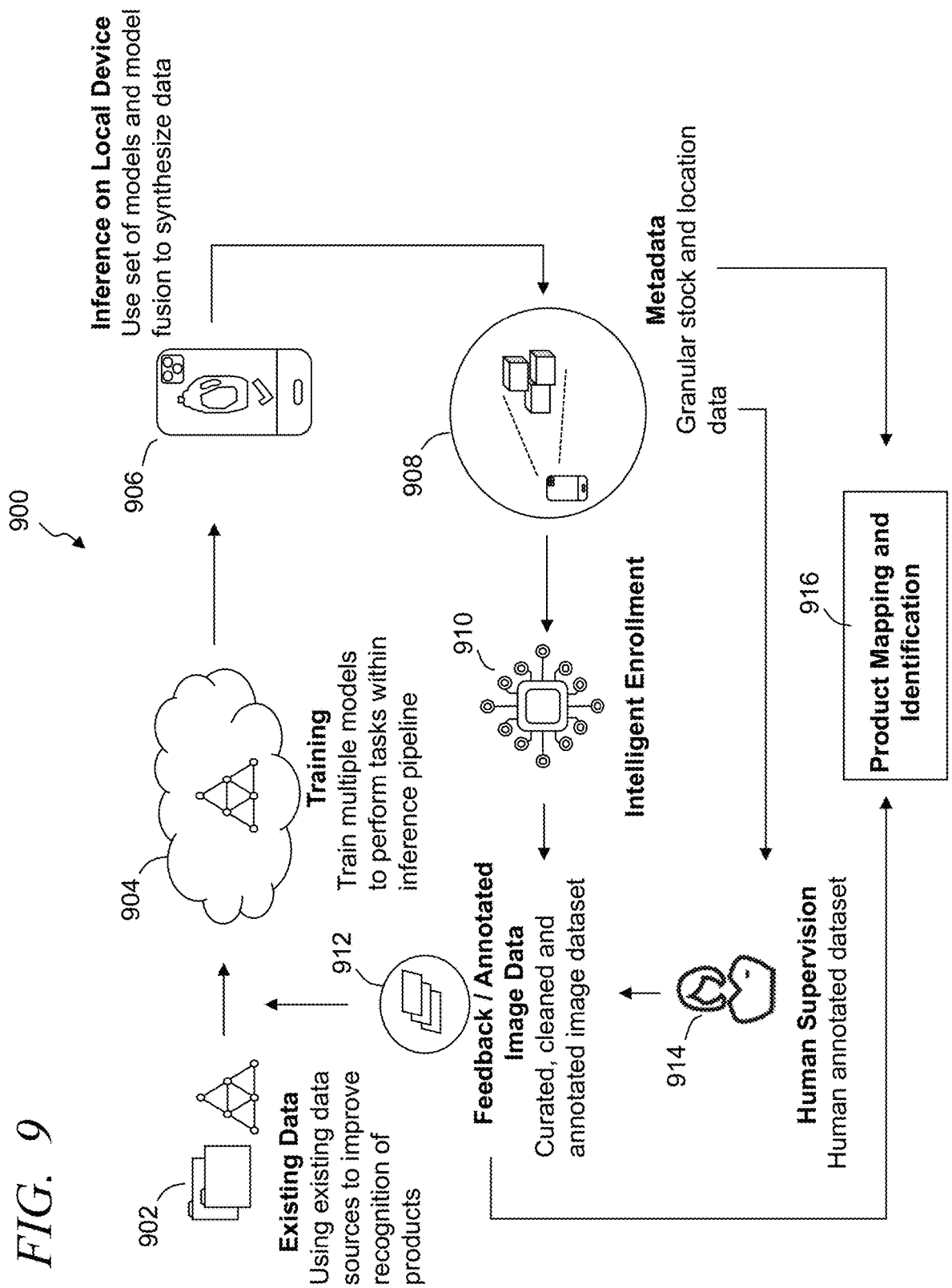
FIG. 9 illustrates a simplified flow diagram of an exemplary process of identifying products in accordance with some embodiments.

FIG. 9 illustrates a simplified flow diagram of an exemplary process 900 of identifying products in accordance with some embodiments. Existing product data is maintained 902 in one or more databases 110. This information can be generated by a retail entity, a product manufacturer, a product distributor and/or other sources. The existing product data can include product images of known products. Further, in some instances, the product data can include additional information such as but not limited to dimensions, shape, colors, color schemes, patterns, text, image processing data (e.g., product identifying vector), other such information or a combination of two or more of such information for tens of thousands or hundreds of thousands of products. This know product data can continue to be updated with new products, additional information for existing products, modifications to product information (e.g., based on changes to product packaging and/or labeling by the manufacturer, etc.), and/or other such updates and/or modifications. The known product data is used to train and retrain 904 multiple machine learning models through one or more model training systems 112 and/or servers. These training systems and/or servers can be implemented by the retail facility, a retail company, a third party service or other entity. The trained models can be maintained in one or more databases and some or all of these models can be distributed to the PI systems 208. The models distributed can, in some embodiments, be dependent on expected products to be identified, locations within the retail facility to be evaluated by the product mapping system, types of PI systems being utilized, other such factors, or a combination of two or more of such factors.

The PI systems 208 can locally apply 906 one or more models and use model fusion to synthesize and/or process image data, other product data, location data and/or other data in attempting to identify products within the retail facility. Product identifying information 908 is generated by the PI systems 208 in one or more formats that can be used by the mobile control circuit in generating product mapping 916 of one or more portions of the retail facility. As described above, some embodiments utilize additional image capture systems 114 and/or portable devices 115 to provide product identifying information. In some embodiments, the product mapping provides product location information, product count information, as well as other information about the product support systems and/or the retail facility (e.g., gaps, empty spaces, product placement, etc.). The product mapping information is communicated from the mobile control circuit to one or more servers, databases, services and/or other entities to be utilized in numerous different ways by the retail entity, retail company, product manufacturers, product distributors, and/or other entities that can benefit from the information. Some systems implement use 910 of the product mapping to control inventory quantities, direct and/or control distributing products and/or managing products on the product support systems, and/or otherwise automatically utilize the product mapping information (e.g., shelf facing, restocking, moving products, identification of incorrectly placed product, etc.).

In some embodiments, some or all of the product identifying information and/or product mapping 916 is utilized as feedback 912 to be used in subsequent training and/or retraining of one or more machine learning models and/or to enhance the known product data 902. Still further, the feedback, in some embodiments, can further include human interactions 914 regarding product information and/or images. For example, in instances where an items on a product support system could not be identified and/or a predicted identification was obtained that did not achieve a threshold product identification probabilities, that information can be directed to one or more subsequent processing systems and/or one or more human evaluators. The results of the subsequent evaluation can be further provided as part of the feedback 912 for product information and/or model training. Some embodiments utilize additional information as feedback 912, such as information about user actions based on product mapping, such as but not limited to restocking, product facing activities, product movement, re-ordering products, adjustments to order quantities, real-location of portions of the product support systems, other such user actions, or a combination of two or more of such actions. In some embodiments, models can be trained and/or retained based on images, frames of video content and/or other such image data of the products available from the retail facility, product manufacturers, product distributers and/or other sources. Still further, some embodiments limit the training of one or more of the PI systems to reduce computational processing and/or memory requirements to implement the PI systems and/or apply the models. For example, the training of one or more models may be limited to a sub-set of products that are available in the retail facility. Other embodiments, however, do not apply limits and train the models based on a known set of products that are expected and/or capable of being positioned within the retail facility. Operation of the PI systems can be enhanced by removing applications and/or processing within the PI systems that are not directed to product identification and corresponding processing. For example, when PI systems are implemented through a smartphone, functionality not associated with product identification can be removed to improve available memory and/or improve processing capabilities.

Some embodiments utilize one or more product mapping systems 102 to provide on-device custom object and/or product detection and product recognition inference in a cluster setup to create a universal view of the store inventory availability. The product identification, in some embodiments, utilizes a combination of machine learning models applied to image data. The product mapping systems 102 provides a cluster processing system 206 comprise a set of mobile devices implemented as PI systems 208, each with a different field of view, and a mobile control system 211 that binds the product data from the PI systems together and connects to one or more distributed communication networks 106 for numerous subsequent uses and/or processing. In some embodiments, the PI systems 208 implement sensor fusion between two or more of the PI systems for location, planogram compliance, product recognition out of stock detection and/or other such functions. The utilization of one or more of the product mapping systems 102 and/or combination of other image capture systems within the retail facility enables real time product inventory mapping of one or more portions of the retail facility (e.g., one or more portions of the sales floor, one or more portions of a fulfillment facility, one or more portions of a back storage area, one or more portions of a warehouse, etc.). In some embodiments, the product mapping system 102 can further provide real time associate feedback regarding product reorientation, product replenish stock, provide data annotation and/or other relevant information. Still further, some embodiments enable onboarding and/or product recognition of never before captured products as the PI systems recognize products.

The retail inventory identification system 100 and/or one or more product mapping systems 102 provide an inventory scanning solution on a device scanning cluster setup that solves for various use cases, such as Out of Stock, Online Pick Up & Delivery Nil Picks, Planogram Compliance, Modular updates, plug detections, Product locations, Top Stock tracking, other such solutions and/or a combination of such solutions. The retail inventory identification system 100 can be utilized as part of an inventory management solution that utilizes one or more product mapping systems 102, which can be a non-robotic, partially autonomous and/or completely autonomous, that employ mobile PI systems running a computer vision and machine learning models inference in a cluster (shared processing) within a retail facility. The retail inventory identification system 100 provides a data generation platform with the ability to identify product inventory (existing or missing) using on-device processing that results in low operational costs and real-time insights. Some embodiments provide a platform that is hardware agnostic that can utilize substantially any mobile device that can execute the models on captured image data. The system enables product identification Inference to be performed on the PI systems. In some embodiments, the PI systems and/or mobile control system connect with one another. One or many devices combine data from the cluster and synchronizes some or all the data, which can be used locally and/or distributed over one or more distributed communication networks 106 to other systems for utilization. Some embodiments utilize a messaging system between the PI systems and/or mobile control system allowing for sharing data, device health information, remote configuration, data queries and/or other such communications and/or functionality.

The PI systems 208, as described above, provided predicted product identification data for products determined to be present in one or more images. The identification can be a serial number, a universal product code (UPC), a barcode number, product name, product size, product dimensions, item count within the product packaging and/or other such information This product identifying information, in some implementations, further includes location data. The product mapping generated can be used for numerous different benefits and/or can be used to acquire additional information. As some non-limiting examples, the product mapping information can be used at least in part to identify stock levels (UPC {onShelf (is product available), percentage availability, count estimate of availability}); topStock {section [UPSs [quantity health, etc.]]}); inventory count (UPC{on Shelf, count availability}); stock health (UPC {facings [health (e.g., leaking, damaged, general appearance, etc.)]}); facing (UPC {facings [horizontal facing; vertical facing; horizontal angle, vertical angle, etc.]}); modular compliance (UPC {modular compliance score (e.g., score representing compliance of UPC is with planogram)}); shelf label (information about corresponding shelf label (x coordinate, y coordinate, price, UPC, etc.)); and/or other such information. Similarly, the location information can include one or more of: store location (UPC {combine store and modular location information}); aisle location (store number, zone, aisle name or number, etc.); section location; depth position (UPC {facing (depth of the facing from the shelf front edge)}); shelf location (UPC {facing [modular x and y coordinates]}); product physical dimensions (UPC {dimensional width(s) of the facing, dimensional height(s) of the facing}), and/or other such information.

In some embodiments, an associate can initiate a product capture session with the product mapping system 102. In other embodiments, the product mapping system can automatically initiate the capture and identification. Further, in some implementations, the mobile control circuit synchronizes and/or initiates the image capture by the PI systems 208. The PI systems can capture frames, detect objects from the frames, perform UPC prediction through one or more methods (e.g., machine learning models, vectorization, other such methods, or a combination of two or more of such methods), identify missing products and/or gaps on the product support systems, and other capabilities such as plug detection, price correction, etc. In some embodiments, when there is an occlusion of some of the product support system and/or one or more products detected and/or an error is detected during the image capture, the PI system and/or the mobile control system provides the associate with real-time feedback for corrective action and/or autonomously initiates corrective action (e.g., restart image capture, cause movement and/or adjust a position of the product mapping system 102, generate an alert, limit use of the image(s) where occlusion occurred (e.g., cut image into multiple sub-sections around the occlusion and detect products that can be detected, use multiple images with different perspectives and/or fields of view to stitch a full image together, pause image capture for one or more threshold periods in an effort to determine whether occlusion clears up (e.g., occlusion moves), other such actions or a combination of two or more of such actions. The PI systems can synchronize with the mobile control system by providing the product metadata for their respective field of view as the product mapping system 102 is moved along the one or more product support systems. In some embodiments, the mobile control system combines, filters and process metadata from the multiple PI systems, and/or communicates some or all of the metadata to one or more systems over one or more of the communication networks 106.

In some embodiments, a retail facility associate pushes the product mapping system 102 through one or more portions or sections of the retail facility in providing bulk scanning of products as part of inventory scans. The product mapping system, in some implementations, provides real-time feedback to the associate with regards to speed, change of position, change of movement, back-up, left, right, capture quality, occlusion detection, configurable actionable insights such as replenishment, plugs, etc., and/or other such information or a combination of two or more of such information. In other embodiments, the product mapping system 102 includes one or more control systems that control one or more motors to autonomously implement the capture and product identification, which may occur based on a schedule. The PI systems 208, in some embodiments, are strategically positioned at different heights, levels and/or positions so that two or more different PI systems have different fields of view and can cover various field of views. For instance, when enabled with our artificial intelligence and/or computer vision software, each PI system can view and/or scan products from the bottom shelves, top of the shelves, or a combination of two or more shelves. Some PI systems 208 and/or image capture systems 214 of a PI system can cover a broader view of products while another PI system and/or another image capture system of a PI system can focus specifically on product markings (e.g., barcodes, watermarking, etc.), shelf labels, etc.

Typically, each of the PI systems 208 processes and identifies products within their respective area of vision or image capture. A set of machine learning models are deployed to each of the PI systems which are applied by the PI systems to processes every frame captured to detect products shapes and identify the product (e.g., identify a UPC) within their area of vision. The cluster of PI systems of the mobile product mapping system perform inference and processing locally, which in part reduces or prevents taxing the retail facility computational backbone. Further data capture for product detection typically does not transmit images to external systems in order for processing in product detection. Instead, product detection is implemented through the plurality of PI systems. Metadata of the product identification can subsequently be communicated and fed to respective external systems to process for actionable insights. In some implementations, some or all of the data captures (e.g., images and metadata) can subsequently be communicated to remote devices and/or systems for ad hoc remote data queries, machine learning, accuracy evaluation, and/or other such processing. For example, feedback can be implemented to use data capture for subsequent model training and/or retraining over a remote server local at the retail facility and/or remote from the retail facility. Typically, images with individuals capture are discarded and/or individuals are removed before the images are transferred from the PI system and/or product mapping system.

The PI systems and/or the mobile control system can communicate to coordinate the operation of the product mapping system 102 and/or the product identification. The mobile control system 211, in some embodiments, synchronizes the data generated by the plurality of PI systems 208 of a product mapping system 102. Further, in some implementations, the mobile control circuit 210 can control functions of the PI systems such as camera resolution, machine learning models to be applied, cameras to use, software upgrades, synchronization of software among PI systems, and/or other such control. In some embodiments, the mobile control circuit additionally or alternatively controls the mode of product capture (e.g., capture for training purposes, data capture for product recognition, data capture as a result of a remote request for data (i.e. a query made to send back pictures of a particular product in a particular position), etc.). The mobile control circuit 210, in some implementations, provides instructions to and/or guides retail facility associates to one or more portions of the retail facility where product recognition is to be implemented by the product mapping system 102. In some embodiments, the mobile control circuit 210 removes product overlaps when two or more cameras capture the same product (e.g., same product, same physical location, same UPC, same price, same art, and/or other such confirmation that the product is the same in two or more images).

Figure 10:
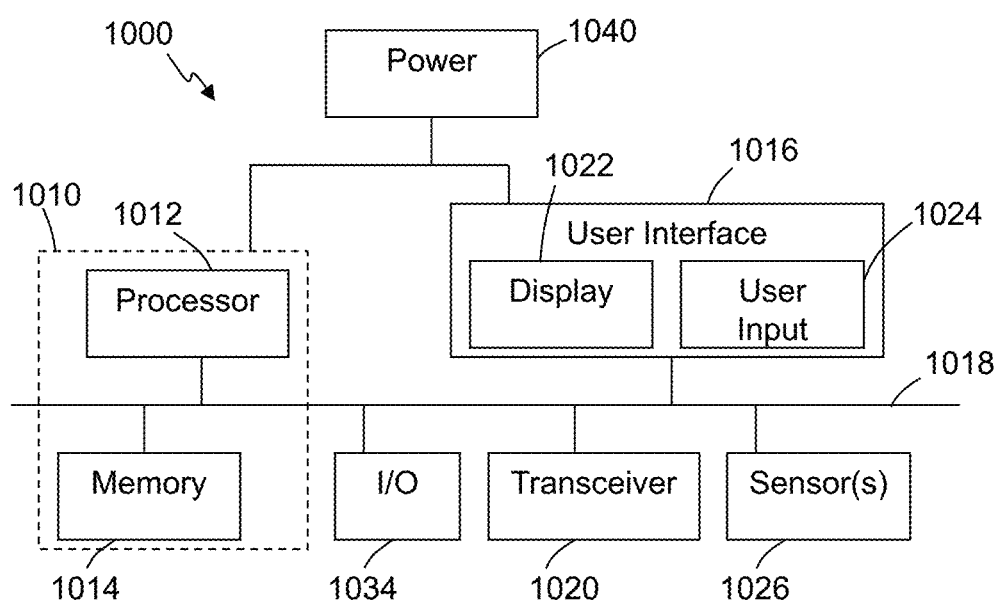
FIG. 10 illustrates an exemplary system for use in implementing methods, techniques, devices, apparatuses, systems, servers, sources and providing image capture, image processing and product identification, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 10 illustrates an exemplary system 1000 that may be used for implementing any of the components, circuits, circuitry, systems, functionality, apparatuses, processes, or devices of the inventory identification system 100, one or more of the product mapping systems 102, and/or other above or below mentioned systems or devices, or parts of such circuits, circuitry, functionality, systems, apparatuses, processes, or devices. For example, the system 1000 may be used to implement some or all of the product mapping system 102, inventory management control system 104, model training systems 112, additional image capture systems 114, sensor systems 116, and/or other such components, circuitry, functionality and/or devices. However, the use of the system 1000 or any portion thereof is certainly not required.

By way of example, the system 1000 may comprise a control circuit or processor module 1012, memory 1014, and one or more communication links 1018, paths, buses or the like. Some embodiments may include one or more user interfaces 1016, and/or one or more internal and/or external power sources or supplies 1040. The control circuit 1012 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 1012 can be part of control circuitry and/or a control system 1010, which may be implemented through one or more processors with access to one or more memory 1014 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 1000 may be used to implement one or more of the above or below, or parts of, components, circuits, systems, processes and the like.

The user interface 1016 can allow a user to interact with the system 1000 and receive information through the system. In some instances, the user interface 1016 includes a display 1022 and/or one or more user inputs 1024, such as buttons, touch screen, track ball, keyboard, mouse, etc., which can be part of or wired or wirelessly coupled with the system 1000. Typically, the system 1000 further includes one or more communication interfaces, ports, transceivers 1020 and the like allowing the system 1000 to communicate over a communication bus, a distributed computer and/or communication network 106 (e.g., a local area network (LAN), the Internet, wide area network (WAN), etc.), communication link 1018, other networks or communication channels with other devices and/or other such communications or combination of two or more of such communication methods. Further the transceiver 1020 can be configured for wired, wireless, optical, fiber optical cable, satellite, or other such communication configurations or combinations of two or more of such communications. Some embodiments include one or more input/output (I/O) 1034 interfaces and/or ports that allow one or more devices to couple with the system 1000. The I/O ports can be substantially any relevant port or combinations of ports, such as but not limited to USB, Ethernet, or other such ports. The I/O interface 1034 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 1026 to provide information to the system and/or sensor information that is communicated to another component, such as the product mapping systems 102, inventory management control system 104, model training system 112, etc. The sensors can include substantially any relevant sensor, such as distance measurement sensors (e.g., optical units, sound/ultrasound units, etc.), optical-based scanning sensors to sense and read optical patterns (e.g., bar codes), radio frequency identification (RFID) tag reader sensors capable of reading RFID tags in proximity to the sensor, location determination systems, global positioning systems, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 1000 comprises an example of a control and/or processor-based system with the control circuit 1012. Again, the control circuit 1012 can be implemented through one or more processors, controllers, central processing units, logic, software and the like. Further, in some implementations the control circuit 1012 may provide multiprocessor functionality.

The memory 1014, which can be accessed by the control circuit 1012, typically includes one or more processor-readable and/or computer-readable media accessed by at least the control circuit 1012, and can include volatile and/or nonvolatile media, such as RAM, ROM, EEPROM, flash memory and/or other memory technology. Further, the memory 1014 is shown as internal to the control system 1010; however, the memory 1014 can be internal, external or a combination of internal and external memory. Similarly, some or all of the memory 1014 can be internal, external or a combination of internal and external memory of the control circuit 1012. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 106. The memory 1014 can store code, software, executables, scripts, data, content, lists, programming, programs, log or history data, user information, customer information, product information, and the like. While FIG. 10 illustrates the various components being coupled together via a bus, it is understood that the various components may actually be coupled to the control circuit and/or one or more other components directly.

Generally speaking, pursuant to various embodiments, systems, apparatuses and methods are provided herein that provide retail product recognition local on portable PI systems 208 through local multi-model image processing of images and/or frames of video content captured by the respective PI system and/or one of the other PI systems when implementing distributed processing and/or cooperative operation. The multi-model applications and cooperative evaluation enables the system to run in substantially real-time as image and/or video content is captured on the PI system, and provide very quick product recognition that can be run locally on the PI system, even off-line and not communicatively coupled with a wireless communication network, and without having to communicate data from the PI systems and wait for a reply. Further, such image and/or video product recognition can simplify obtaining product identifying information because often a barcode cannot be accessed or is inconvenient to be accessed (e.g., large products, hot products, etc.).

In some embodiments, the system 100 includes one or more model training systems 112 that train one or more machine learning models and/or update training of such models to be distributed to product mapping systems 102. The training, in some implementations, utilizes information provided by the PI systems based on local image processing by the PI systems through trained machine learning models being applied by the PI systems. Additionally or alternatively, some PI systems and/or other image capturing systems can supply image data and/or video data to the model training systems to be used in recognizing a product within the images and/or to further train the models based on the application of the models.

Further, some embodiments include one or more inventory management control systems 104 that track and maintain inventory information about product quantities at one or more retail stores, products on order, quantities of products typically ordered, past order history and/or other such information. This inventory information may be accessed by one or more circuits, systems and/or devices of the system 100, such as the databases that store the inventory information, a central server to track location of inventory and/or provide location information to the inventory system, portable devices in obtaining product information once a product has been identified through image processing, and the like.

In some embodiments, provide retail inventory identification systems, comprising: a mobile first product mapping system comprising: a transport system enabling the first product mapping system to be moved through a retail facility, a tower housing, and a cluster processing system comprising: a plurality of product identifying (PI) systems secured with the tower housing with each of the plurality of product identifying systems in different orientations each directed along a different field of view, and a mobile control circuit communicatively coupled with each of the plurality of PI systems, wherein the plurality of PI systems are configured to cooperatively and simultaneously operate; wherein each of the plurality of PI systems comprises an image capture system, and a location determination system configured to track a location within the retail facility of the respective PI system in association with images captured by the image capture system, wherein each of the plurality of PI systems is configured to: capture, by the image capture system, images of multiple different products supported on product support systems within the retail facility; and locally process the respective images comprising applying a plurality of different machine learning modeling techniques to at least a portion of each of the images, to infer an identification of multiple products on one or more of the product support systems and generate product identifying information of the multiple products in association with location information of each of the multiple products; and wherein the mobile control circuit is configured to receive the product identifying information from each of the plurality of PI systems; generate, from the received product identifying information and without utilizing the images from the plurality of PI systems, product identifying mapping of the products being supported by the product support systems captured in the images by the plurality of PI systems as the first product mapping system moves along a portion of the retail facility wherein the product identifying mapping comprises for each inferred identified product a product identifier and location coordinates of the inferred identified product; and communicate the generated product identifying mapping to a central inventory management control system.

Some embodiments provide methods of retail inventory identification, comprising: tracking a location of a mobile first product mapping system as the first product mapping system is controlled to move within a retail facility, wherein the first product mapping system comprises a tower housing and a cluster processing system comprising a plurality of product identifying (PI) systems secured with the tower housing with each of the plurality PI systems in different orientations each directed along a different field of view; cooperatively and simultaneously operating the plurality of PI systems and capturing, by a respective image capture system of each of the plurality of PI systems, images of multiple different products supported on product support systems within the retail facility; locally processing, by each of the plurality of PI systems, the respective images comprising applying a plurality of different machine learning modeling techniques to at least a portion of each of the images and inferring an identification of multiple products on one or more of the product support systems; generating product identifying information of the multiple products in association with location information of each of the multiple products; receiving, at a mobile control circuit of the first product mapping system and in real time as the first product mapping system is moved within the retail facility, the product identifying information from each of the plurality of PI systems; generating, from the received product identifying information and without utilizing the images from the plurality of PI systems, product identifying mapping of the products being supported by the product support systems captured in the images by the plurality of PI systems as the first product mapping system moves along a portion of the retail facility wherein the product identifying mapping comprises for each inferred identified product a product identifier and location coordinates of the identified product; and communicating the generated product identifying mapping to a central inventory management control system.

The variously presented examples above are intended to be illustrative and are not intended to convey an exhaustive listing of all possible examples. Instead, it will be understood that these teachings will accommodate any of a wide variety of circumstances in a given application setting. Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A retail inventory identification system, comprising:
a mobile first product mapping system comprising: a transport system enabling the first product mapping system to be moved through a retail facility, a tower housing, and a cluster processing system comprising: a plurality of product identifying (PI) systems secured with the tower housing with each of the plurality of product identifying systems in different orientations each directed along a different field of view, and a mobile control circuit communicatively coupled with each of the plurality of PI systems, wherein the plurality of PI systems are configured to cooperatively and simultaneously operate;
wherein each of the plurality of PI systems comprises an image capture system, and a location determination system configured to track a location within the retail facility of the respective PI system in association with images captured by the image capture system, wherein each of the plurality of PI systems is configured to:
capture, by the image capture system, images of multiple different products supported on product support systems within the retail facility; and
locally process the respective images comprising applying a plurality of different machine learning modeling techniques to at least a portion of each of the images, to infer an identification of multiple products on one or more of the product support systems and generate product identifying information of the multiple products in association with location information of each of the multiple products, wherein the product identifying information comprises for each of the multiple products a respective inferred product identifier and respective location coordinates; and
wherein the mobile control circuit is configured to receive the product identifying information from each of the plurality of PI systems; generate, from the received product identifying information and without utilizing the images from the plurality of PI systems, product identifying mapping of the multiple products being supported by the product support systems captured in the images by the plurality of PI systems as the first product mapping system moves along a portion of the retail facility wherein the product identifying mapping comprises for each inferred identified product the inferred product identifier and the location coordinates of the inferred identified product; and communicate the generated product identifying mapping to a central inventory management control system.

2. The retail inventory identification system of claim 1, wherein the mobile control circuit is further configured to control each of the plurality of PI systems in specifying the respective plurality of different machine learning modeling techniques to be applied by the respective PI systems of a set of multiple different machine learning model techniques available to be applied by the respective PI system.

3. The retail inventory identification system of claim 1, wherein each of the plurality of PI systems is configured to locally process the respective images to define a series of bounding boarders, wherein each of the bounding boarders is associated with and represents a location within the respective image of a product of a set of products captured in the respective image.

4. The retail inventory identification system of claim 1, wherein each of the plurality of PI systems is configured to filter image data based on a known orientation of the respective image capture system and the corresponding known respective field of view to restrict processing of a subset of the image data corresponding to a predefined vertical portion of the field of view that limits image processing of vertical overlap of respective fields of view between two of the PI systems.

5. The retail inventory identification system of claim 1, wherein a first PI system, of the plurality of PI systems, further comprises an additional image capture system configured to capture a set of one or more additional images, and the first PI system configured to process the one or more additional images to identify predefined markers on front surfaces of at least one of the product support systems, and to utilize the identified predefined markers in the inferred identification of the multiple products.

6. The retail inventory identification system of claim 1, wherein each of the plurality of PI systems is further configured to incorporate into the product identifying information a predicted location of each of the multiple products identified in the images.

7. The retail inventory identification system of claim 1, wherein each of the plurality of PI systems further comprise a location sensor system configured to identify a current location of the respective PI system in association with each captured image, and wherein each of the plurality of PI systems is further configured to access a retail facility planogram defining expected location information of expected products on the product support systems, and infers the identification of the multiple products as a function of the retail facility planogram and the current location.

8. The retail inventory identification system of claim 7, wherein the mobile control circuit is further configured to access the retail facility planogram and generate the product identifying mapping of the products as a function of the retail facility planogram in association with the product identifying information.

9. The retail inventory identification system of claim 1, wherein each of the plurality of PI systems further comprise a location sensor system configured to identify location coordinates of the respective PI system as the first product mapping system is transported through the retail facility; and
wherein the mobile control circuit is configured to receive the location coordinates from one or more of the plurality of PI systems and determine, based on the location coordinates, path correction instructions to be implemented as the first product mapping system is transported through the retail facility and control the first product mapping system in causing the path correction instructions to be implemented.

10. A method of retail inventory identification, comprising:
tracking a location of a mobile first product mapping system as the first product mapping system is controlled to move within a retail facility, wherein the first product mapping system comprises a tower housing and a cluster processing system comprising a plurality of product identifying (PI) systems secured with the tower housing with each of the plurality PI systems in different orientations each directed along a different field of view;
cooperatively and simultaneously operating the plurality of PI systems and capturing, by a respective image capture system of each of the plurality of PI systems, images of multiple different products supported on product support systems within the retail facility;
locally processing, by each of the plurality of PI systems, the respective images comprising applying a plurality of different machine learning modeling techniques to at least a portion of each of the images and inferring an identification of multiple products on one or more of the product support systems;
generating, by each of the plurality of PI systems, respective product identifying information of the multiple products in association with location information of each of the multiple products, wherein the product identifying information comprises for each of the multiple products a respective inferred product identifier and respective location coordinates;
receiving, at a mobile control circuit of the first product mapping system and in real time as the first product mapping system is moved within the retail facility, the product identifying information from each of the plurality of PI systems;
generating, from the received product identifying information and without utilizing the images from the plurality of PI systems, product identifying mapping of the products being supported by the product support systems captured in the images by the plurality of PI systems as the first product mapping system moves along a portion of the retail facility wherein the product identifying mapping comprises for each of the inferred identified product the product identifier and the location coordinates of the identified product; and
communicating the generated product identifying mapping to a central inventory management control system.

11. The method of claim 10, further comprising:
controlling, by the mobile control circuit, each of the plurality of PI systems in specifying the respective plurality of different machine learning modeling techniques to be applied by the respective PI systems of a set of multiple different machine learning model techniques available to be applied by the respective PI system.

12. The method of claim 10, wherein the locally processing, by each of the plurality of PI systems, the respective images comprises defining a series of bounding boarders, wherein each of the bounding boarders is associated with and represents a location within the respective image of a product of a set of products captured in the respective image.

13. The method of claim 10, wherein the locally processing, by each of the plurality of PI systems, the respective images comprises filtering image data based on a known orientation of the respective image capture system and the corresponding known respective field of view in restricting processing of a subset of the image data corresponding to a predefined vertical portion of the field of view that limits image processing of vertical overlap of respective fields of view between two of the plurality of PI systems.

14. The method of claim 10, further comprising:
capturing, by an additional image capture system of a first PI system of the plurality of PI systems, a set of one or more additional images;
processing, by the first PI system, the one or more additional images and identifying predefined markers on front surfaces of at least one of the product support systems; and
utilizing the identified predefined markers in the identifying of the multiple products.

15. The method of claim 10, further comprising:
incorporating, by the plurality of PI systems, into the product identifying information a predicted location of each of the multiple products identified in the images.

16. The method of claim 10, further comprising:
identifying, through a location sensor system of each of the plurality of PI systems, a current location of the respective PI system in association with each captured image;
accessing, by each of the plurality of PI systems, a retail facility planogram defining expected location information of expected products on the product support systems; and
inferring the identification of the multiple products as a function of the retail facility planogram and the current location.

17. The method of claim 16, further comprising:
accessing, by the mobile control circuit, the retail facility planogram; and
generating the product identifying mapping of the products as a function of the retail facility planogram in association with the product identifying information.

18. The method of claim 10, further comprising:
identify, by a location sensor system of each of the plurality of PI systems, location coordinates of the respective PI system as the first product mapping system is transported through the retail facility; and
receiving, by the mobile control circuit, the location coordinates from one or more of the plurality of PI systems; and
determining, based on the location coordinates, path correction instructions to be implemented as the first product mapping system is transported through the retail facility and control the first product mapping system in causing the path correction instructions to be implemented.

19. The retail inventory identification system of claim 1, wherein the product identifying mapping comprises a mapping specifying placement of each of the inferred identified products within the portion of the retail facility and the location coordinates comprising three-dimensional (3D) coordinates of each of the inferred identified products within the product support systems.

20. The retail inventory identification system of claim 19, wherein the product identifying mapping comprises product count information, empty spaces of the product support systems and product placement of each of the inferred identified products.

* * * * *